(12) United States Patent
Kahn et al.

(10) Patent No.: US 11,983,938 B2
(45) Date of Patent: May 14, 2024

(54) VIRTUAL SAFETY MANAGER

(71) Applicant: NETRADYNE, INC., San Diego, CA (US)

(72) Inventors: Adam David Kahn, San Diego, CA (US); Venkat Ramanan Venkatachalam Jayaraman, San Diego, CA (US); Stephan Franklin Dunn, Kingwood, TX (US); Matthew Karl Drake, San Diego, CA (US); Venkata Sreekanta Reddy Annapureddy, San Diego, CA (US); Pratik Verma, Bengaluru (IN); Aravind P (Padmasanan), Kozhikode (IN); Vinay Kumar Rai, Bengaluru (IN); Hemanth Roy Badugu, Bengaluru (IN); Michael Campos, La Jolla, CA (US); David Jonathan Julian, San Diego, CA (US); Avneesh Agrawal, Bengaluru (IN)

(73) Assignee: NETRADYNE, INC., San Diego, CA (US)

( * ) Notice: Subject to any disclaimer, the term of this patent is extended or adjusted under 35 U.S.C. 154(b) by 35 days.

(21) Appl. No.: 17/777,830

(22) PCT Filed: Nov. 20, 2020

(86) PCT No.: PCT/US2020/061620
§ 371 (c)(1),
(2) Date: May 18, 2022

(87) PCT Pub. No.: WO2021/102334
PCT Pub. Date: May 27, 2021

(65) Prior Publication Data
US 2023/0154204 A1 May 18, 2023

Related U.S. Application Data

(60) Provisional application No. 62/938,102, filed on Nov. 20, 2019.

(51) Int. Cl.
*G06V 20/58* (2022.01)
*B60W 40/09* (2012.01)
(Continued)

(52) U.S. Cl.
CPC .......... *G06V 20/588* (2022.01); *B60W 40/09* (2013.01); *B60W 50/14* (2013.01); *G06V 20/44* (2022.01);
(Continued)

(58) Field of Classification Search
CPC .. G06V 20/588; G06V 20/584; G06V 20/597; G06V 20/44; B60W 40/09;
(Continued)

(56) References Cited

U.S. PATENT DOCUMENTS

2016/0335814 A1 11/2016 Tamari et al.
2017/0053555 A1 2/2017 Angel et al.
(Continued)

FOREIGN PATENT DOCUMENTS

WO 2018026733 A1 2/2018

OTHER PUBLICATIONS

Extended European Search Report in EP Patent Application No. 20888779.4 dated Nov. 11, 2022 (10 pages).
(Continued)

*Primary Examiner* — Robert P Bullington
(74) *Attorney, Agent, or Firm* — Foley & Lardner LLP

(57) ABSTRACT

Systems and methods for curating video and other driving-related data for use in driver coaching, which may include selecting or ranking driving behaviors for coaching, select-
(Continued)

ing or ranking drivers for coaching, selecting or ranking video and other data to be used in coaching, preparing for, scheduling, and summarizing coaching sessions, matching the format of coaching to the behavior or person being coached, preventing unsafe driving situations, influencing job dispatch decisions based on safety scores, and/or reducing data bandwidth usage based on a determined coaching effectiveness of video data.

25 Claims, 16 Drawing Sheets

(51) Int. Cl.
    *B60W 50/14*      (2020.01)
    *G06V 20/40*      (2022.01)
    *G06V 20/56*      (2022.01)
    *G06V 20/59*      (2022.01)
    *G08G 1/04*      (2006.01)
    *G08G 1/16*      (2006.01)
    *H04N 7/18*      (2006.01)

(52) U.S. Cl.
    CPC .......... *G06V 20/584* (2022.01); *G06V 20/597* (2022.01); *G08G 1/04* (2013.01); *G08G 1/165* (2013.01); *G08G 1/166* (2013.01); *H04N 7/185* (2013.01); *B60W 2050/146* (2013.01); *B60W 2420/403* (2013.01); *B60W 2540/229* (2020.02); *B60W 2540/30* (2013.01)

(58) Field of Classification Search
    CPC .......... B60W 50/14; B60W 2540/229; B60W 2050/146; B60W 2420/42; B60W 2540/30; G08G 1/04; G08G 1/165; G08G 1/166; H04N 7/185
    USPC ........................................................ 382/104
    See application file for complete search history.

(56) References Cited

U.S. PATENT DOCUMENTS

| | | |
|---|---|---|
| 2017/0061222 A1 | 3/2017 | Hoye et al. |
| 2019/0168767 A1 | 6/2019 | Gaither et al. |
| 2019/0265712 A1 | 8/2019 | Satzoda et al. |
| 2019/0333371 A1 | 10/2019 | Julian et al. |

OTHER PUBLICATIONS

International Search Report and Written Opinion in International Patent Application No. PCT/US20/61620 dated Feb. 26, 2021 (7 pages).

International Preliminary Report on Patentability in in International Patent Application No. PCT/US20/61620 dated Dec. 21, 2021 (3 pages).

$$\text{tailgate['severity']} = (w1 * \text{tailgate['followingTime\_CV']} +$$
$$w2 * \text{tailgate['no\_tg\_per\_video']} +$$
$$w3 * \text{tailgate['no\_lane\_change\_per\_video']} +$$
$$w4 * \text{tailgate['tailgate\_duration']} - 10/60.0 +$$
$$w5 * (1.0/\text{tailgate['followingTime\_min']}) +$$
$$)$$

```
W = { 'hard_brakings' : 2.0/15.0,
   'BH_avg_speed' : 3.8/15.0,
   'BH_followingTime_avg' : 1.0/15.0,
   'inv_BH_followingTime_min' : 2.0/15.0,
   'BH_max_speed' : 2.0/15.0,
   'alert_duration' : 0.2/15.0,
   'intensity' : 3.0/15.0,
   'num_lane_change_BH' : 1.0/15.0
  }
```

FIG. 9

| ACTIVITY | DAILY | WEEKLY | MONTHLY | OWNER |
|---|---|---|---|---|
| Prepare to Coach | X | | | Coach |
| Schedule Coaching (F2F & remote) | | X | | Coach |
| Complete & document coaching (F2F & remote) | | X | | Coach |
| Review coaching summary | | | X | Safety Manager |
| Identify & track toop risky drivers | | | X | Safety Manager |
| Measure coaching effectiveness | | | X | Safety Manager |
| Communicate coaching effectiveness | | | X | Safety Manager |

Monthly report:
July 2019

Fleet average(July): 846
Fleet average(June): 886

Active drivers(July): 611
Active drivers(June): 635

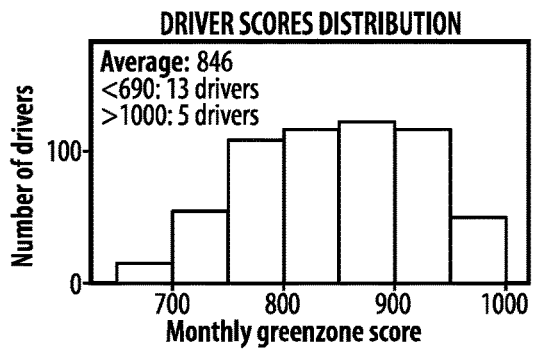

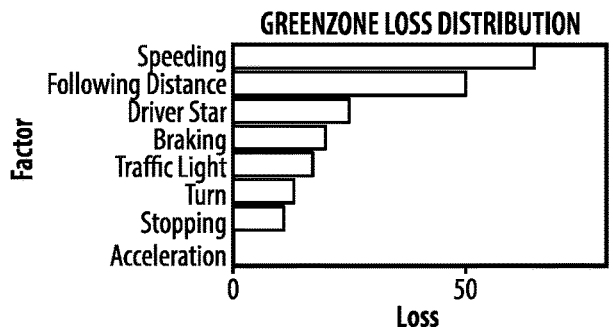

Top 5 drivers

| Name | Driver ID | Jul score | Jun score | Comments (Max loss) |
|---|---|---|---|---|
| Driver 1 | 1234 | 1001 | 981 | FD loss: 23 |
| Driver 2 | 6166 | 1000 | 1000 | |
| Driver 3 | 6168 | 1000 | 805 | |
| Driver 4 | 9627 | 1000 | NA | |
| Driver 5 | 9580 | 1000 | 770 | |

Bottom 5 drivers

| Name | Driver ID | Jul score | Jun score | Comments (Max loss) |
|---|---|---|---|---|
| Driver 607 | 10991 | 664 | 731 | speeding loss: 133 |
| Driver 608 | 2966 | 663 | 733 | speeding loss: 133 |
| Driver 609 | 9216 | 663 | NA | speeding loss: 133 |
| Driver 610 | 9602 | 658 | 826 | speeding loss: 133 |
| Driver 611 | 2240 | 646 | 812 | speeding loss: 133 |

Risk Profile: Hard Driving, Traffic Compliance & Speeding

Hard Driving

| Alert type | Normal count (%) | Moderate count (%) | Severe count (%) |
|---|---|---|---|
| Acceleration | 1.9 M (100.0%) | 0(0%) | 19(0%) |
| Brakings | 3.5 M (99.9%) | 2980(0.1%) | 524(0%) |
| Turns | 0.2 M (99.87%) | 2875(0.1%) | 15(0%) |

Traffic Compliance

| | Normal count (%) | Moderate count (%) | Severe count (%) |
|---|---|---|---|
| Traffic light | 758 K (99.7%) | 2196(0.3%) | 345(0.1%) |
| Stopping | 250 K (97.6%) | 5288(2.1%) | 857(0.3%) |

Following Distance & Speeding

| | Normal count (%) | Moderate count (%) | Severe count (%) |
|---|---|---|---|
| Following distance | 3.2 M (52.5%) | 2.8 M (46.9%) | 36 K (0.6%) |
| Speeding | NA | 10.9 K (99.1%) | 97(0.9%) |

Positive Driving:
Driver stars: 973 in 4164027 driving minutes.

FIG. 15

Following Distance Insights

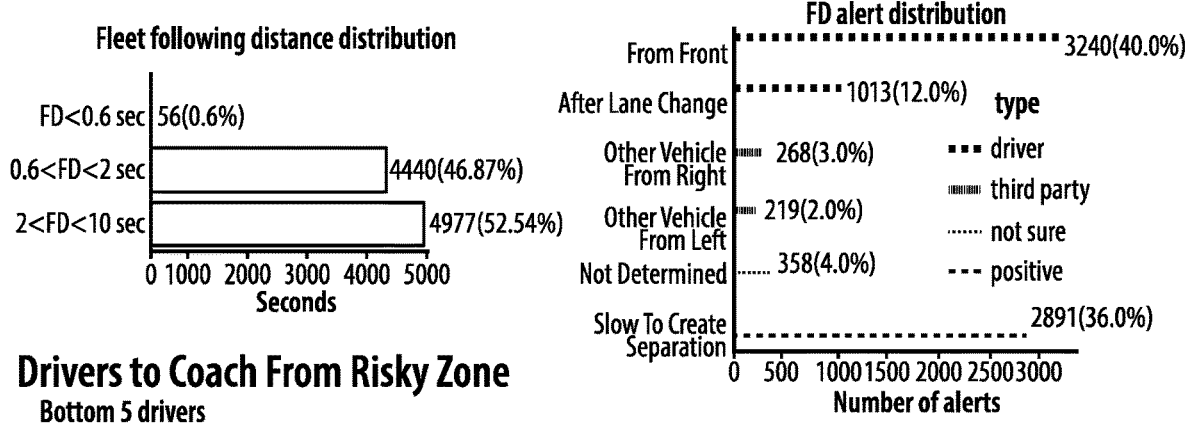

Drivers to Coach From Risky Zone
Bottom 5 drivers

| Driver Name | Total driving minutes | GZ Loss due to FD | FD Distrubution | | | | Number of hard-braking (vehicle in front) |
| | | | FD<0.6s Driving time (%) | 0.6s<FD<2s Driving time (%) | 2s<FD<10s Driving time (%) | FD<10s Driving time (%) | |
|---|---|---|---|---|---|---|---|
| Joseph | 3375 | 76 | 0.18 | 2.87 | 1.99 | 94.95 | 0 |
| James | 4333 | 79 | 0.14 | 2.61 | 1.42 | 95.83 | 0 |
| Albert | 1399 | 73 | 0.13 | 3.06 | 2.02 | 94.79 | 1 |
| Kevin | 6587 | 74 | 0.12 | 2.42 | 1.66 | 95.8 | 0 |
| Brian | 5355 | 68 | 0.09 | 1.52 | 1.53 | 96.86 | 0 |

Top 5 drivers

| Daniel | 52 | NA | 0.0 | 0.0 | 0.0 | 100.0 | 0 |
| George | 10424 | 0 | 0.0 | 0.0 | 0.0 | 100.0 | 0 |
| Thomas | 180 | NA | 0.0 | 0.19 | 0.65 | 99.16 | 0 |
| Timothy | 2650 | 0 | 0.0 | 0.0 | 0.0 | 100.0 | 0 |
| Gary | 81 | NA | 0.0 | 0.18 | 1.11 | 98.71 | 0 |

Most severe following distance (FD) alerts

| Driver Name | Alert ID | Alert video | Closest FD | FD duration |
|---|---|---|---|---|
| Driver A | 2945 | https://idms.netradyne.com/console/#/alerts/29⎯ | 0.16 | 10.79 |
| Driver B | 2940 | https://idms.netradyne.com/console/#/alerts/29⎯ | 0.17 | 18.19 |
| Driver C | 2730 | https://idms.netradyne.com/console/#/alerts/27⎯ | 0.18 | 19.82 |
| Driver D | 2785 | https://idms.netradyne.com/console/#/alerts/27⎯ | 0.21 | 25.82 |
| Driver E | 2780 | https://idms.netradyne.com/console/#/alerts27/⎯ | 0.24 | 40.41 |

Most severe hard braking (HB) alerts

| Driver Name | Alert ID | Alert video | HB Intensity (G Force) |
|---|---|---|---|
| Driver F | 2900 | https://idms.netradyne.com/console/#/alerts/29⎯ | 7.4 |
| Driver G | 2860 | https://idms.netradyne.com/console/#/alerts/28⎯ | 6.0 |
| Driver H | 2890 | https://idms.netradyne.com/console/#/alerts/28⎯ | 6.1 |
| Driver I | 2780 | https://idms.netradyne.com/console/#/alerts/27⎯ | 6.0 |
| Driver J | 2790 | https://idms.netradyne.com/console/#/alerts27/⎯ | 5.6 |

FIG. 16

- CSA Scores
  - Traffic Citations
- Predictive Metrics
  - Traffic Violations
    - Speeding
    - Red Lights
    - Stop Signs
    - U-turn Signs

VIRTUAL SAFETY MANAGER

CROSS-REFERENCE TO RELATED APPLICATION

This application is a U.S. National Phase Application under 35 U.S.C. § 371 of International Application No. PCT/US20/61620, filed on Nov. 20, 2020, which claims the benefit of and priority to U.S. Provisional Application No. 62/938,102, filed on Nov. 20, 2019, and titled, "VIRTUAL SAFETY MANAGER," the entire contents of which are hereby incorporated by reference in their entireties.

BACKGROUND

Field

Certain aspects of the present disclosure generally relate to Intelligent Driving/Driver Monitoring Systems (IDMS), Advanced Driver Assistance Systems (ADAS), and Autonomous Driving Systems, and more particularly to systems and methods for curating video and other driving-related data for use in coaching.

Background

Vehicles, such as automobiles, trucks, tractors, motorcycles, bicycles, airplanes, drones, ships, boats, submarines, and others are typically operated and controlled by human drivers. Through training and with experience, a human driver may learn how to drive a vehicle safely and efficiently in a range of conditions or contexts. For example, as an automobile driver gains experience, he may become adept at driving in challenging conditions such as rain, snow, or darkness.

Drivers may sometimes drive unsafely or inefficiently. Unsafe driving behavior may endanger the driver and other drivers and may risk damaging the vehicle. Unsafe driving behaviors may also lead to fines. For example, highway patrol officers may issue a citation for speeding. Unsafe driving behavior may also lead to accidents, which may cause physical harm, and which may, in turn lead to an increase in insurance rates for operating a vehicle. Inefficient driving, which may include hard accelerations, may increase the costs associated with operating a vehicle.

Legacy driving/driver monitoring systems may be based on detections of large inertial sensor readings. Such events are then typically reviewed by human operators to determine whether the large inertial sensor reading corresponds to a particular type of unsafe and/or inefficient driving event, such as hard-braking, hard-turning, a collision, and the like. Such systems are typically incapable of detecting certain common driving events that are not accompanied by a large inertial sensor reading. Other systems, which may detect driving events based on video processing, may detect a greater number and range of driving events, including driving events that would be ignored by inertial-based systems. For such video-processing based systems, however, there may be challenges regarding the effective use of the available data. For example, the amount of available data may overwhelm the safety management and coaching resources available at a typical driving fleet.

Accordingly, certain aspects of the present disclosure are directed to systems and methods that may enable fleets to effectively harness data flows made available by driver safety systems that detect driving events based at least in part on video processing.

SUMMARY

Certain aspects of the present disclosure generally relate to providing, implementing, and using a method of curating video and other driving-related data for use in coaching. The methods may involve a camera sensor and/or inertial sensors to detect traffic events, as well analytical methods that may determine an action by a monitored driver that is responsive to the detected traffic event.

Certain aspects of the present disclosure provide a method. The method generally includes receiving visual data from a camera at a device, wherein the camera is affixed to a vehicle, and wherein the device is proximate to the camera; detecting, by at least one processor of the device, a plurality of non-collision driving events within a preconfigured period of time based at least in part on the visual data, wherein each driving event of the plurality of non-collision driving events belongs to a first type of driving event; selecting a first driving event from the plurality of non-collision driving events as a coachable example of the first type of driving event; and presenting, to the driver of the vehicle, a first segment of the visual data corresponding to the selected first driving event.

Certain aspects of the present disclosure provide a system. The system generally includes a memory and a processor coupled to the memory. The processor is configured to receive visual data from a camera at a device, wherein the camera is affixed to a vehicle, and wherein the device is proximate to the camera; detect, by at least one processor of the device, a plurality of non-collision driving events within a preconfigured period of time based at least in part on the visual data, wherein each driving event of the plurality of non-collision driving events belongs to a first type of driving event; select a first driving event from the plurality of non-collision driving events as a coachable example of the first type of driving event; and present, to the driver of the vehicle, a first segment of the visual data corresponding to the selected first driving event.

Certain aspects of the present disclosure provide a non-transitory computer readable medium, having instructions stored thereon. Upon execution, the instructions cause the computing device to perform operations comprising receiving visual data from a camera at a device, wherein the camera is affixed to a vehicle, and wherein the device is proximate to the camera; detecting, by at least one processor of the device, a plurality of non-collision driving events within a preconfigured period of time based at least in part on the visual data, wherein each driving event of the plurality of non-collision driving events belongs to a first type of driving event; selecting a first driving event from the plurality of non-collision driving events as a coachable example of the first type of driving event; and presenting, to the driver of the vehicle, a first segment of the visual data corresponding to the selected first driving event.

Certain aspects of the present disclosure provide a system. The system generally includes a memory and a processor coupled to the memory. The processor is configured to receive visual data captured by at least one camera associated with a vehicle; determine a coachability score for the visual data; notify a driver, based at least in part on the coachability score, of an availability of the visual data; wherein the driver was driving the vehicle at the time the visual data were recorded; and determine that the driver acknowledged the notification Certain aspects of the present disclosure provide a non-transitory computer readable medium, having instructions stored thereon. Upon execution, the instructions cause the computing device to perform operations comprising: receiving visual data captured by at least one camera associated with a vehicle; determining a coachability score for the visual data; notifying a driver, based at least in part on the coachability score, of an availability of the visual data; wherein the driver was driving the vehicle at the time the visual data were recorded; and determining that the driver acknowledged the notification.

Certain aspects of the present disclosure provide a method. The method generally includes receiving visual data captured by at least one camera associated with a vehicle; determining a coachability score for the visual data; notifying a driver, based at least in part on the coachability score, of an availability of the visual data; wherein the driver was driving the vehicle at the time the visual data were recorded; and determining that the driver acknowledged the notification.

BRIEF DESCRIPTION OF DRAWINGS

FIG. 9 illustrates an example of a coachability score determination method in accordance with certain aspects of the present disclosure.

FIG. 12 illustrates an example of a coaching or safety manager activity schedule in accordance with certain aspects of the present disclosure.

FIG. 13 illustrates an example of a Coaching App in accordance with certain aspects of the present disclosure.

FIG. 15 illustrates an example of a Monthly Report in accordance with certain aspects of the present disclosure.

FIG. 16 illustrates an example of a Driving Behavior Report in accordance with certain aspects of the present disclosure.

DETAILED DESCRIPTION

Figure 1:
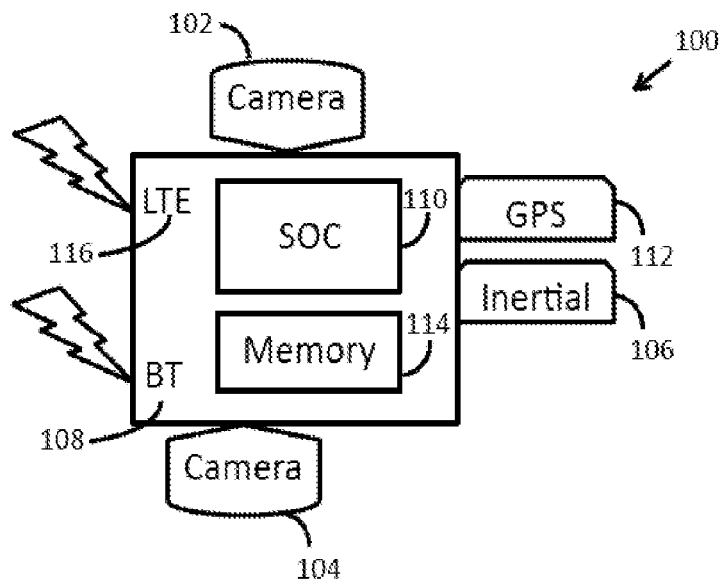
FIG. 1 illustrates an example of a system for driver coaching in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented, or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different technologies, system configurations, data networks, and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Vision-Based Monitoring at Scale

Substantially continuous vision-based monitoring of driver behavior enables insight into instances and patterns of risk that may not be discernible by inertial-trigger-based driver monitoring systems. Some of the potential for insight, however, may be left unrealized if the amount of data made available to safety managers, driving coaches, and the like, is overwhelming.

Legacy inertial-trigger-based safety systems may upload video data whenever a signal on a co-located inertial sensor indicates that the inertial trace exceeds a set threshold. The false alarm rates that would be associated with raw inertial-trigger events, however, would be so common that such systems tend to rely on human-in-the-loop review. That is, human reviewers may be tasked with sifting through candidate events to identify events that actually qualify as valid unsafe driving events. Discard events from such a review process may include events recorded when a vehicle was driven at a moderate speed over a pothole, among others.

While human-in-the-loop review may improve an inertial-trigger based-system, it also introduces a processing bottleneck that limits the amount of video and associated data that may be analyzed. Typical embodiments of a primarily inertial-trigger-based safety system may upload approximately 10 minutes of video data per driver per month, which may be allocated among 20-30 events. After manual exclusion of false alarms, an average of about five instances of risky or unsafe driving events may pass human review and then be shared with a driver's safety manager.

With such a dearth of data, safety managers trying to improve safety practices across a fleet may focus their efforts on reactive, rather than proactive, methods of improving safety. In one example, fleet drivers may be awarded safety bonuses based on how long they have driven without a collision. Such a safety system may be considered reactive in the sense that a driver's safety bonus may be decreased or withheld as a result of the driver's involvement in a collision.

The dependency of legacy fleet safety systems on the human review of video data may have been necessitated by poor precision of a purely or substantially inertial-based system. Because so many irrelevant driving events may be accompanied by an above-threshold inertial sensor reading, a substantial allocation of data bandwidth and human review bandwidth may be dedicated to event detection, that is, determining whether a putative driving event is a true positive or a false negative. In contrast, an AI dashcam system featuring on-device visual processing, such as a DRIVERI™ produced by NETRADYNE™, may perform visual analysis on the edge device and with a precision that obviates the human review of an inertial based system.

An example of a device that contains a processor configured to perform visual analysis in accordance with certain aspects of the present disclosure is illustrated in FIG. 1. The device may include a CPU, a GPU and/or specialized deep learning processor (which may be integrated into a System-on-a-Chip (SOC) 110), memory storage 114, four cameras (two cameras 102 and 104 are shown), communication channels (which may include Bluetooth (BT) 108 and Long-Term Evolution (LTE) 116 communication channels), and integrated inertial sensors 106. The system may be further configured to access wheel odometry via a wired or wireless connection directly to the sensor path or via a CAN Bus. The system may also include a Global Positioning System (GPS) 112, which may include an antenna that is integrated into a motherboard that also contains the SOC 110, or that may be placed at another location on the vehicle, such as on the roof.

Figure 2:
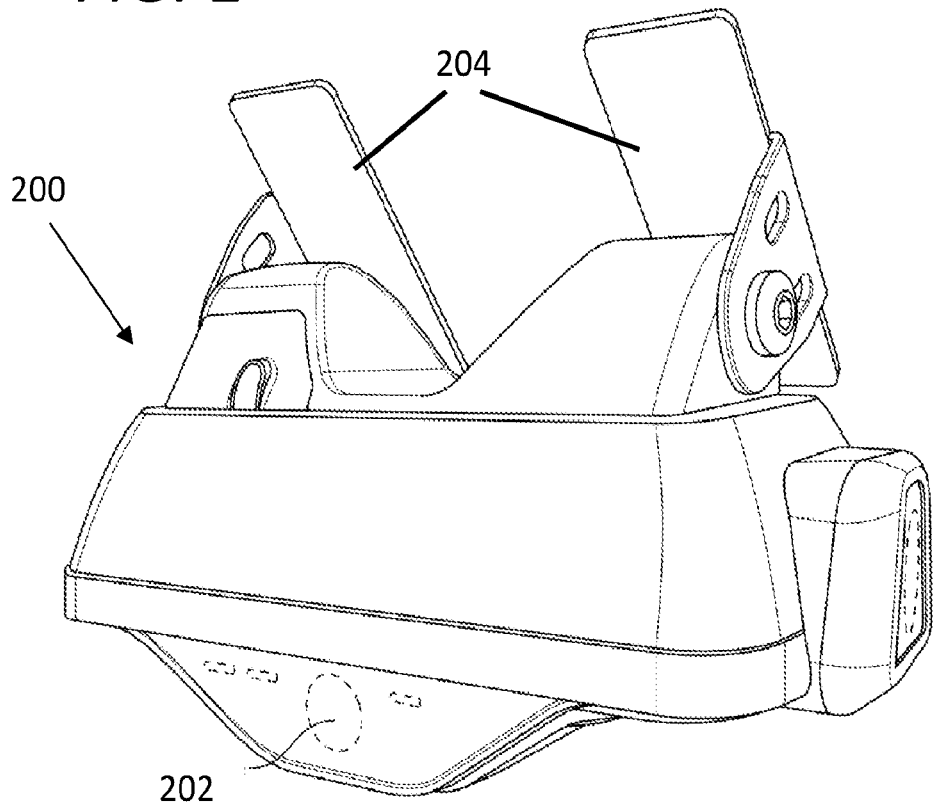
FIG. 2 illustrates an example of a driver monitoring system in accordance with certain aspects of the present disclosure.

The device 100 may be integrated into a device body 200 as illustrated in FIG. 2. The device body 200 may include one or more camera apertures, such as a driver-facing camera aperture 202. The system may be considered a vision-based Internet-of-Things (IoT) driving monitoring system, intelligent dashcam system, AI dashcam, and the like. The device body may include mounting brackets 204 which may facilitate mounting of the device to a windshield of a vehicle According to certain aspects of the present disclosure, video and other data from candidate events may be retained on the device, along with metrics that describe the events. Subsequent determinations as to whether a certain candidate event should be transmitted off the device may then take into account those locally computed metrics. In addition, according to certain aspects, a determination to upload a candidate event may take into account locally computed metrics over other similar events. In this way, the data bandwidth that is utilized by the device may reflect a curated selection of events. For example, various types of driving events may be defined, and a small number of representative events of each type may be selected for upload and/or for a coaching session with the driver.

For legacy systems, and for certain embodiments of aspects of the present disclosure, a fleet safety system may be designed so that it operates with a data bandwidth quota or allocation. For legacy systems, a data bandwidth quota may cause the safety system to ignore long periods of driving from individual drivers, such as time periods of driving that occur after the data quota is reached. The approach of locally storing candidate events and then selectively uploading a curated sample, in accordance with certain aspects of the present disclosure, may also be applied to inertial-triggered events. When applied to legacy, inertial-triggered candidate events, these techniques may overcome quota-based challenges. In one example, some devices may trigger larger numbers of candidate inertial-triggered events by virtue of the way that the device are mounted to the vehicle. Some device installations may be less firm than others, for example, which may cause more false alarm events. When there is a low precision at the stage of detecting a candidate event, and when candidate events are uploaded automatically (perhaps limited by a data allocation), the number of uploaded alerts may tend to correlate to with irrelevant factors such as the stability of the device mount on the windshield. As such, drivers who drive such vehicles may be unfairly tagged for coaching concerns at a rate that is higher than it would be if it were based on driving habits instead. Precision issues of inertial-based driver monitoring systems may then be a source of coaching bias. For a system with a higher precision rate, such as one that includes on-device visual object detection, many such false alarms may be eliminated. For example, events for which there are no nearby detected vehicles may be determined to be likely false alarms. Similarly, events for which other vehicles are detected and tracked, and observed to jitter in a vertical direction at a location corresponding to the inertial event as recorded by the device may be determined to be a likely false alarm. In contrast, events for which other vehicles are detected and tracked, are nearby, and for which vehicle trajectories are consistent with post-collision behaviors may be assigned a higher likelihood of upload. After a certain period, such as a day or a work week, the observations associated with the different candidate events may be compared, and then the candidate events may be ranked on that basis. The events with the highest ranking may be transmitted to a cloud server and other candidate events may deleted without transmission to a remote server. As a consequence of retaining candidate event data, comparing visual observations data across the different candidates belonging to the same event type, and then selectively transmitting the video data corresponding to the candidate events in the sample that are most likely to be valid (not a false alarm) or otherwise useful for a coaching session, a system enabled with certain aspects of the present disclosure may continue to transmit valid and useful data and ignore likely false alarms even in situations for which there is a poor device or camera mount. In such situations, the number of uploaded alerts may correlate more clearly with unsafe driving habits.

A primarily vision-based system, unlike a primarily inertial-based system, may provide insight into the entirety of each driver's working day. In a vision-based system, because video data are processed at the point of data collection (which may include detection and tracking of relevant objects such as cars, trucks, traffic signs, traffic lights, lane lines, and road boundaries), the bottleneck of human-in-the-loop review may be substantially avoided. Furthermore, from the perspective of a safety manager seeking insight into the driving habits of a driver, rather than wait for a rare and costly opportunity of a ride-along coaching session, the same level of insight into a driver's driving habits may be accessed through selective retrieval and/or upload of visual data in accordance with certain aspects of the present disclosure.

Upon using a primarily vision-based system for the first time, a safety manager may become aware of certain driving behaviors for which there was no visibility previously. For example, drivers being monitored by a primarily inertial-based system are sometimes known to "adapt" to the monitoring device by rolling through stop signs or running red lights without slowing down, because braking could cause the inertial system to trigger a video review of the event. Accordingly, stop sign related behaviors may initially become a significant trigger of video-based driving exception events (which may be referred to as "stop sign alerts") after the fleet switches to a vision-based system. A customer transitioning from a legacy system to a vision-based system may describe the experience of this new insight as, "Are you kidding me? I never knew this was going on, but they're all doing California roll stops."

This greatly improved opportunity for more insight may create new and different challenges. Rather than having too little data, the safety manager may find that they now have too much. Put simply, without the benefits of one or more of the teachings disclosed herein, more visibility into the driving incidents and habits of a driver could mean more work. In some cases, the amount of data available could overwhelm human operators.

Accordingly, certain aspects of the present disclosure are directed to automating what to coach on, which driver to coach, and when, and further to streamline coaching workflows. These teachings may ultimately yield greater safety and, at the same time, lessen the burden on safety professionals. Certain systems and methods are provided herein that may facilitate effective review and analysis of driving behavior risk events and trends, consistently and at a scale. Furthermore, certain embodiments may include automated tools to affect driver behavior.

Automated tools, and certain related teachings disclosed herein, may be considered ways of "closing the loop." By taking a large data pipe of driver-risk related data, filtering and organizing data sources, and then selectively pointing automatically curated portions of the data back to the drivers, a driver's safety-oriented behavior may be maintained or improved. Systems and methods may include direct communications to drivers that may incorporate coachable video and/or related data. Alternatively, or in addition, driver behavior may be influenced by indirect communications, for example through the messages and actions of dispatchers, safety managers, job-allocation market boards, ride-share customers, and the like, who may review safety profile information at various levels of granularity.

Virtual Safety Manager

An integrated system comprising embodiments of one or more of the teachings disclosed herein may be referred to as a Virtual Safety Manager. A Virtual Safety Manager may enhance managed coaching. According to certain aspects, a Virtual Safety Manager may refer to a system or method that may rank, sort, and/or prioritize candidate driving-event video data based on, for example, a predicted coaching effectiveness score, as described below.

By applying systems and methods disclosed herein, a safety program may be more consistent and less susceptible to bias in comparison with safety programs which require human operators to make large numbers of subjective decisions. Accordingly, safety compliance targets may be efficiently monitored and influenced in a manner that may be fair in its application to different drivers.

Some embodiments may include recognition of positive and/or compliant driving behaviors, such as are often associated with more experienced drivers who may generally exhibit relatively low accident risk. Furthermore, by recognizing positive driving in a consistent manner, certain aspects of the present disclosure may indirectly improve driver retention. Even among trucking fleets with excellent reputations, turnover rates are often between 35%-55%.

In some embodiments, a Virtual Safety Manager may act independently, or substantially independently, of a human safety manager to enable a type of self-coaching by drivers. In these examples, a Virtual Safety Manager may enable a safety program that may scale up to many drivers so that the fleet may address the needs of a larger number of managed drivers, while at the same time providing coaching and other feedback that is tailored to each driver. This may be enabled based on a substantially continuous analysis of driving behaviors, curation of coaching data points, and timely presentation of coaching notifications. That is, a Virtual Safety Manager may enable a complete view and management of a driver's driving behavior and may do so at a level of human manager involvement that may be comparable to or less than what may be demanded by current fleet-safety systems.

In some embodiments, a Virtual Safety Manager may operate in a manner that is complementary to a human Safety Manager. Recognizing that human-level scene understanding, intention discernment, and the like, is not yet achievable by automated computer systems, the Virtual Safety Manager may be embodied so as to selectively rely on human operators to analyze certain scenes that may be determined to be ambiguous or unclear based on quantitative metrics. On the other hand, human operators are generally unable to achieve the level of consistency and freedom from bias that is associated with computer code. Accordingly, the Virtual Safety Manager may substantially replace human operators for tasks that require large processing bandwidth, consistent application of policies, randomized selection, and the like.

Figure 3:
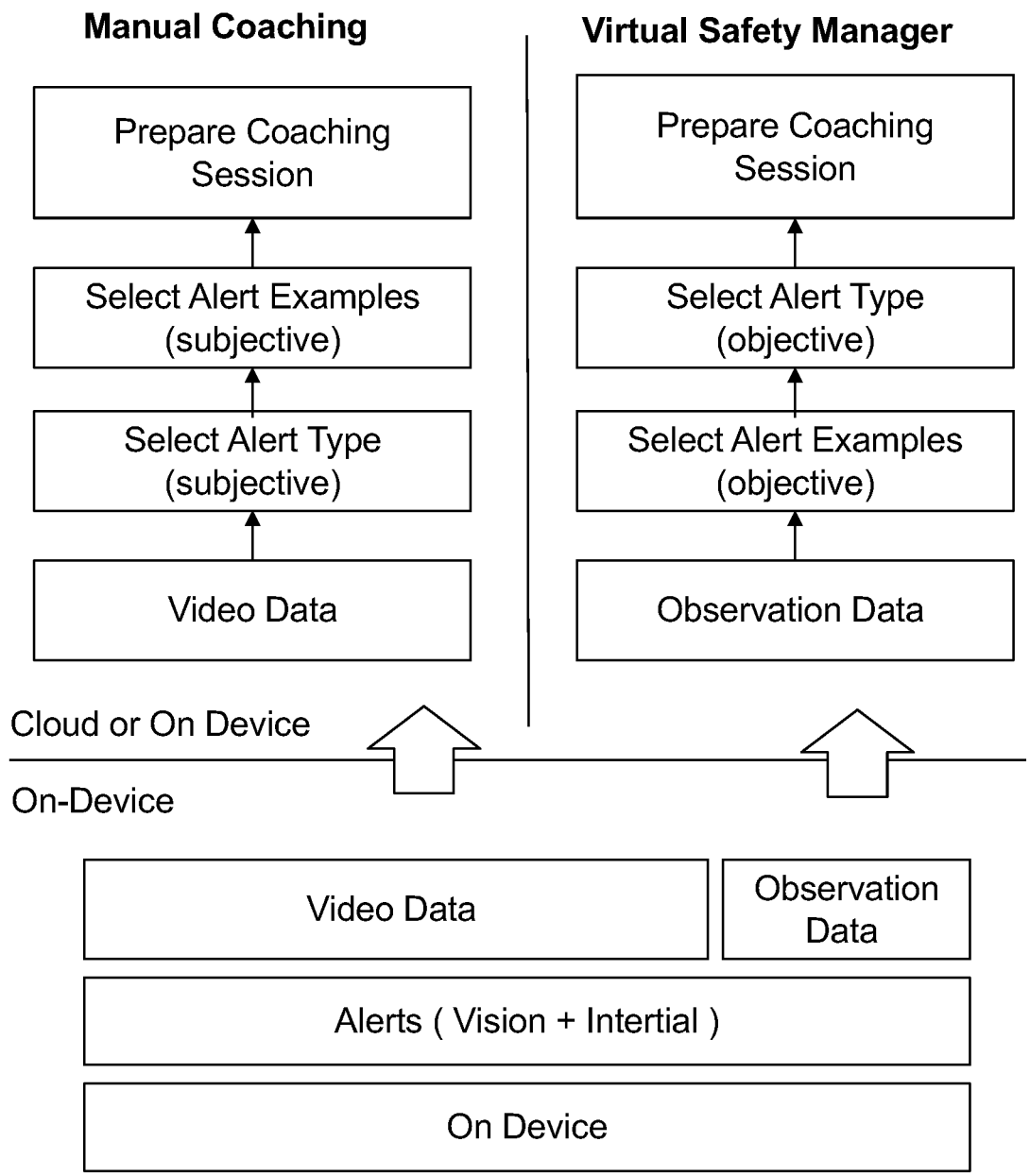
FIG. 3 illustrates examples of manual and automated coaching methods in accordance with certain aspects of the present disclosure.

As illustrated in FIG. 3, a human coach may make one or more subjective decisions in the course of coaching driving behaviors. The human coach may first select which alert types to coach, which may be based at least in part of subjective criteria. The human coach may then select examples from within the chosen Alert type category. This selection may be based on incomplete information as the human operator may be unlikely to review all available data points. In addition, the human operator might choose examples based on subjective rather than objective criteria.

As illustrated on the right column of FIG. 3, a Virtual Safety manager may improve upon human selection in at least two respects. First, the Virtual Safety Manager may objectively evaluate all of the alert examples that may be available in a coaching period. This may be achieved by, for example, determining a coachability score for each alert example as it is recorded, periodically, and/or on an as-needed basis, as described below. Second, the Virtual Safety Manager may focus on alert types on which to coach based on a data-driven assessment of which behaviors may have the greatest need. As a consequence, the Virtual Safety Manager may be free from biases that may become incorporated into analogous human safety manager workflows due to subjective and/or inconsistent decisions that occur through that process.

Some embodiments of certain aspects may include automated methods to allocate human coaching resources. Such automated systems may substantially remove bias and/or inconsistencies from coach-selection processes. Other selection tasks that may be improved by certain aspects of the present disclosure may include determining what behaviors to coach and which driver should be prioritized for coaching. Systems and methods of automatically allocating coaching resources may thereby result in even, efficient, and fair deployment of coaching resources.

Selecting which Driving Behaviors to Coach

Embodiments of certain aspects of the present disclosure may include automated methods of selecting which driving behaviors to coach. Selection techniques may include reactive selection, such as responding to a collision or other high-priority event. In addition, selecting which driving behaviors to coach may be based on detectable driving behaviors that are known or thought to be correlated with accident risk. Even without regard to accident risk, selection may be based on company policies and priorities, including seasonal priorities. Further, selecting which driving behaviors to coach may be based on templates of driving behaviors, such as risk-associated behaviors that match typical profiles of a fleet. In some embodiments, selection may be based on practical considerations, such as focusing on which driving behaviors are improvable or most improvable. Compliance statistics may further inform selection, such that a fleet may focus more resources on driving behaviors associated with behaviors for which compliance statistics suggest the fleet underperforms relative to other similar fleets, a national average, and the like.

Reactive selection of which driving behaviors to coach may refer to an allocation of coaching resources in response to the occurrence of a severe accident, a minor collision, a near-miss, a recorded risky driving event, and the like. A fleet with 20,000 trucks might experience 2-3 severe accidents during an average workday, where a severe accident may be considered to be one involving an injury to a person, or the immobilization of a vehicle. Severe accidents according to these criteria may substantially overlap with the criteria by which a Department of Transportation (DOT) registered fleet may be obligated to record an accident and may be referred to a DOT-recordable event. Such accidents may affect a fleet's DOT Carrier Safety Administration (CSA) crash ratings. The same fleet might experience ten times as many minor collisions, such as collisions with static objects (e.g. a mailbox), or minor collisions with another vehicle in which each driver was able to drive away uninjured.

Upon learning of a severe accident, a safety manager may, according to a company policy, immediately conduct a post-accident investigation. The accident investigation will often include multiple direct conversations with the driver who was involved in the accident. At first, the safety manager may seek to know whether the driver and other vehicle is in immediate need of assistance. Subsequently, the safety manager may seek to understand what happened. Soon after, the safety manager may attempt to schedule a coaching session with the driver to review any driving behaviors that may have contributed to a likelihood of the accident. The selection of driving behaviors to coach in this situation may be considered reactive because the safety manager may focus on driving behaviors that the driver exhibited leading up to and around the time of the accident.

In response to a severe accident, a virtual safety manager, in accordance with certain teachings disclosed herein, may automate certain steps to improve the speed and effectiveness of a post-accident response.

In some embodiments, an IDMS device or smartphone interface may include a physical or software-based button that a driver can push to trigger the compilation of an accident report. Alternatively, or in addition, an IDMS device may be configured to process video and/or other data with a neural network, may determine that a severe accident has occurred and likewise trigger an accident report. Likewise, similar processing could occur on a cloud server after video and/or other data captured around the time of the collision has been transmitted to the cloud server. According to certain aspects, triggering an accident report may include transmitting video data leading up to the accident from a device, such as an IDMS device, that is installed in the vehicle.

The transmitted video may be viewable on a safety manager portal, which may be a website. From the transmitted video available in the portal, a human safety manager, upon learning of the accident, may have a sufficiently rich view into the surrounding circumstance that he does not need to rely solely on the driver's account of what happened. Likewise, the human safety manager may be able to quickly determine from the video that an emergency response is required. In both cases, the virtual safety manager will have unburdened the driver right after the occurrence of an accident, which may enable the driver to be more responsive to the situation around him.

In addition, or alternatively, the transmitted video may be viewable by the driver, for example, via a smartphone app. In some embodiments the video may be transmitted directly from the device to the driver's smartphone app in response to a collision detection. Alternatively, the video may be transmitted to the cloud and then transmitted from the cloud to the driver's smartphone app. In some embodiments, the video may be transmitted to the driver's smartphone app (or similar personal device app, the vehicle's built-in video display, and the like) in response to the driver requesting the video. A request for the video may be made, for example, via a user interface on a smartphone app, built-in display, and the like, that may become visible in response to a detected collision. The user interface may include a button with text, such as a "Save Video," or a similar icon. In response to the user pressing the displayed button video, a system in accordance with the present disclosure may identify a segment of video in the recent past (e.g. 10 minutes) that may be most likely to include a collision, insurance loss event, near-miss, and the like. The retreived video may provide evidence that may exonerate the driver. In some situations, the driver may share the transmitted video data with a responding police officer, which may make the on-scene investigation and police report generation efficient and accurate. In the appropriate scenario, the police officer's report may reflect the video evidence that would exonerate the driver. This may then lead to a rapid resolution of any claims arising out of the event.

A virtual safety manager may therefore facilitate a rapid response to an accident. In some instances, the functions that are automatically performed by the virtual safety manager might make a further response from a human operator unnecessary. In this way, a virtual safety manager, by being configured to transmit and organize video and other data leading up to an accident, may free a human operator from what was one of her more urgent and time-consuming responsibilities. This may then enable a human operator to spend more time and focus engaging in more predictive and preventative safety campaigns so that future accidents may be avoided. As described in detail below, a virtual safety manager may also automate aspects of these predictive and preventative approaches.

Continuing with the present example, a virtual safety manager may prepare a coaching session that is tailored to risky driving behaviors that were exhibited by the driver in a time leading up to the accident. This functionality is described below in the section titled, "Automatically preparing a Coaching Session."

Figure 4:
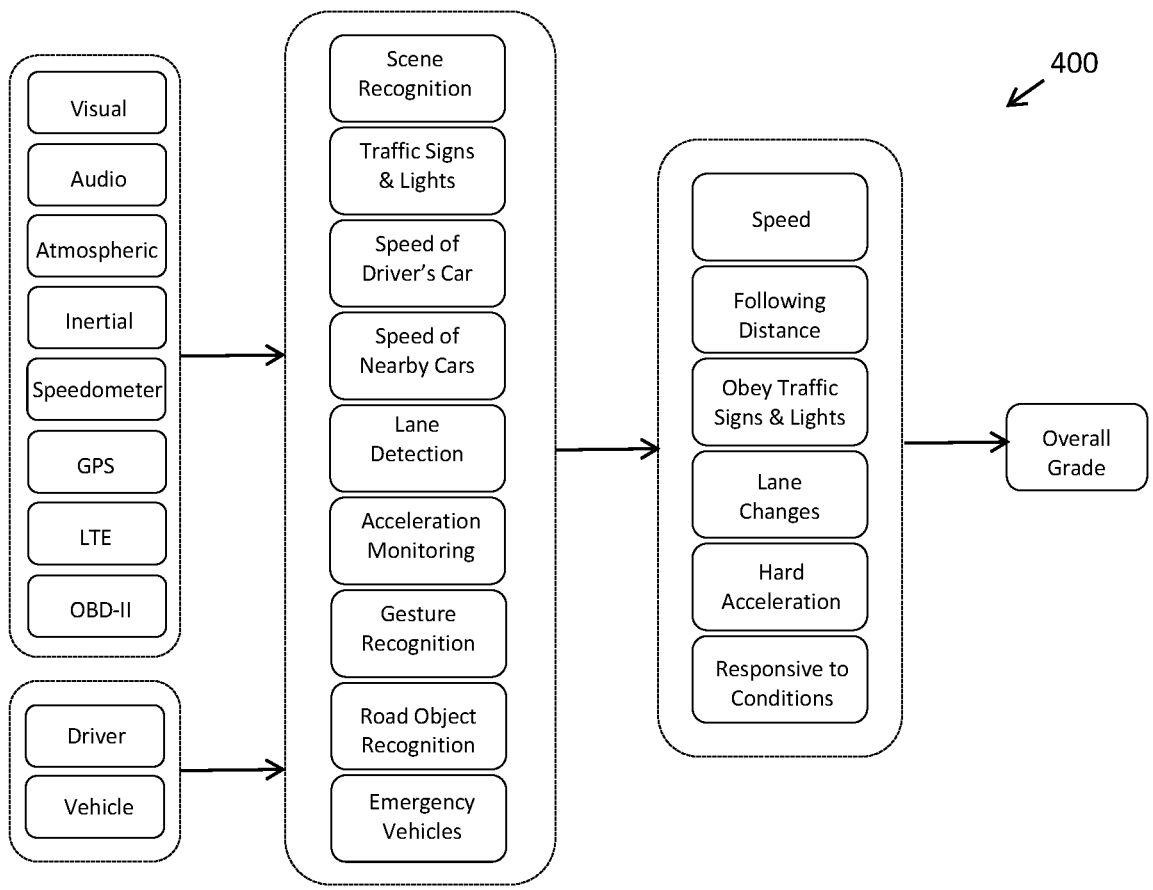
FIG. 4 illustrates an example of a driver monitoring system in accordance with certain aspects of the present disclosure.

Another general category of driving event which, like a collision, may demand a fast and reactive response may be referred to as an "instantly coachable" event. In accordance with certain aspects of the present disclosure, and with disclosure contained in U.S. Pat. No. 10,460,600, filed on Feb. 21, 2017, and entitled "DRIVER BEHAVIOR MONITORING, which is incorporated by reference herein in its entirety, an IDMS may detect that a driver was involved in a variety of unsafe driving events. For example, as illustrated in FIG. 4, unsafe driving events that may be determined by an IDMS 400 may include unsafe speed, unsafe following distance, non-compliant behavior around traffic signs and lights, and the like. Detectable driving scenarios may involve driver behavior ranging from positive, to undesirable, to "instantly coachable". Furthermore, driving events may have been recorded and transmitted to a remote server, and therefore brought to the attention of the safety manager, due to meeting the criteria for previously defined unsafe driving events. A fleet may configure alert types (which may refer to categories or "buckets" of driving events that may share certain common features) that should be treated as instantly coachable. Alternatively, or in addition, a fleet may rely on default settings to categorize certain alert types as instantly coachable, may enable adaptive settings that may depend in part of the current risk profile of the fleet, and the like. Examples of default "instantly coachable" events that are less severe than DOT-recordable accidents may include minor collisions or near-misses. Examples of fleet-configured "instantly coachable" events may include detected violations of a company policy.

As an example of an instantly coachable event, in accordance with certain aspects, a drowsy driving alert video may have captured a driver sleeping, or closing his eyes for extended periods, while driving. In this situation, a safety manager may be compelled to contact the driver as soon as possible. A virtual safety manager may enable such a response on one or more ways, ranging from providing audible feedback directly to the driver in real-time to providing a prioritized notification to a remote manager. Furthermore, a virtual safety manager may prepare and schedule a coaching session with the driver that may be substantially focused on the driver's drowsy driving. In some embodiments, the virtual safety manager may access other data streams that may provide additional context, such as the driver electronic login device (ELD) data, which may further impact the urgency with which a fleet manager should intervene. For example, it may be apparent for ELD data that the driver could not have had adequate sleep before starting his current shift. In some embodiments, if the ELD data indicates that the driver is in violation of Hours-of-Service (HOS) regulations, the virtual safety manager may deliver an audible message to the driver to instruct him or her to stop driving. In cases in which the driver is not technically in violation of HOS regulations, but the ELD data nonetheless indicates that the driver may have a disrupted sleeping pattern, insufficient sleep, and the like, the virtual safety manager may prioritize the notification to a safety manager so that the safety manager may be more likely to review relevant records (e.g. schedule of driving shifts in the past seven days), recent video evidence of driver drowsiness, and the like, to determine whether to intervene immediately.

In another example of an "instantly coachable" driving event, a relative speeding alert might contain video data that an experienced safety manager or coach may consider to be so dangerous that it should be treated as if it had resulted in a collision. For example, the relative speeding alert may contain video of a driver travelling on a highway exit lane, to the right of a row of highway traffic that is moving, on average, at least 15 miles per hour slower than the driver. One of the vehicles in the lane adjacent to the driver may be observed to exit the slow-moving traffic and move directly in front of the driver. In the observed video, the driver may have narrowly avoided colliding with this late-exiting vehicle. In some embodiments, a driver monitoring system may include mechanisms by which a driver may flag certain events for later review with a safety manager. Accordingly, the driver may have pressed a button on the device to call attention to the incident, perhaps believing that narrowly avoiding the accident was a positive indicator of the driver's alertness. In this example, by pressing the button on the device, the driver may create a request for a conversation with a safety manager about the recently experienced safety event. An experienced safety manager, however, may interpret the same situation differently. According to certain aspects of the present disclosure, the safety manager might flag the event as an "instantly coachable" event. This may trigger a virtual safety manager to gather relevant data and prepare a coaching session with the driver so that the specific behavior could be reviewed while it is still fresh in the driver's mind. For example, the video may be reviewed at the end of the driver's shift, and the next time that the driver parks the vehicle, and the like. In accordance with certain aspects, the automatically prepared coaching session may focus on the heightened accident risk associated with entering and exiting highways, which may be exacerbated by a large disparity of traffic speeds in adjacent lanes, because it may be common for third party drivers to try to enter the faster moving lane with little or no warning. In this way, a virtual safety manager can react to and hopefully correct a dangerous habit of the driver soon after the behavior occurs, even if the behavior did not result in a collision in the particular instance. Such feedback may be substantially less effective if the delay between the incident and the coaching session directed to the incident increases.

Upon detecting the occurrence of an event, a virtual safety manager may process the associated data, such as content descriptor data associated with the alert video, which may include detected and tracked vehicles, lane boundaries, signs, and the like in video data, to compute an "instant coachability" score. Such a scoring system may be trained based on records of actions by human operators, such as previous determinations that a single alert video should or should not form the basis of an urgently scheduled coaching session. Alternatively, or in addition, a number of rules and/or heuristics may be employed to score a video for coachability in general, or specifically for "instant" coachability.

A learning system for determining an instant coachability score may learn from a diverse group of human operators. As a result, a high score may indicate that a diverse group of human operators would tend to agree that the subject data correspond to a risky driving behavior that should be coached in an urgent and reactive manner. In some embodiments, a virtual safety manager may learn to pick out particular subsets of a general event type, which may be more effective as a coaching tool than other subsets, because the learning system has learned to compute distinguishing features that a predictive of selection by a human operator, even though human operators might explain their selections based on other features or considerations.

Upon determining that an "instantly coachable" event has occurred, a virtual safety manager may next schedule a coaching session. For example, the virtual safety manager may automatically send a notification to the driver via a smartphone app, either immediately, or at a time that the driver may safely consider coaching on the behavior, such as the next time the driver has pulled off the road. In some scenarios, therefore, a determination that the behavior should be coached "instantly" may indicate that a coaching session should be scheduled urgently, but with a timing that is subject to other considerations. Additional scheduling considerations and techniques are described below in a section entitled, "Automatically scheduling a Coaching Session."

Figure 5:
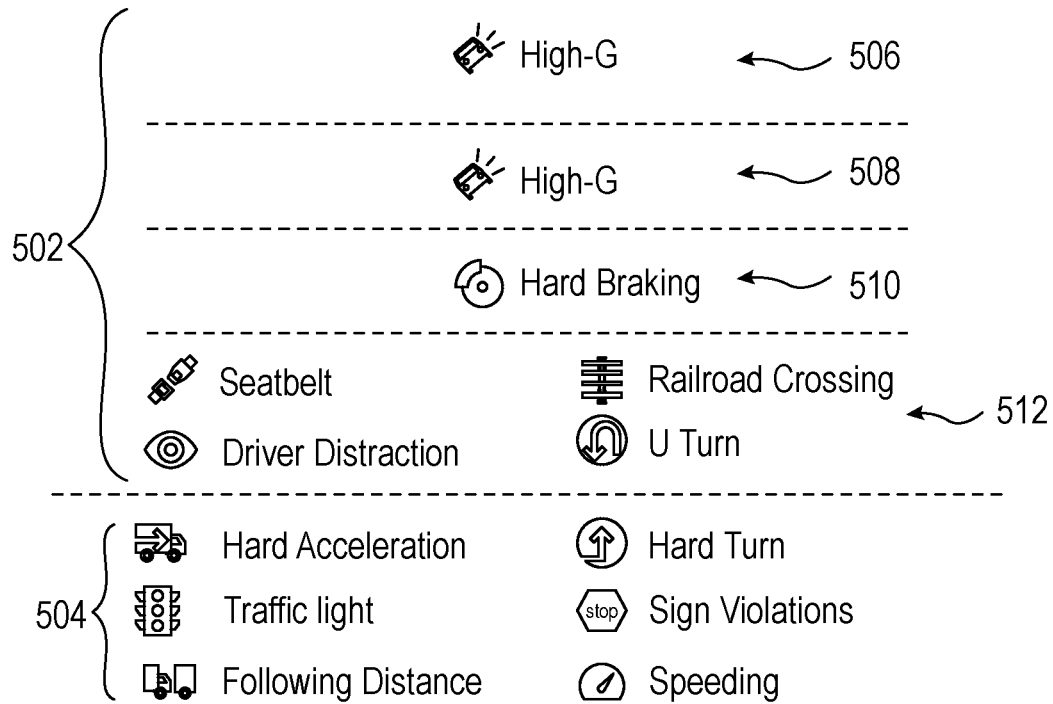
FIG. 5 illustrates an example of alert type selection in accordance with certain aspects of the present disclosure.

FIG. 5 illustrates alert types that may correspond to IDMS-detectable driving scenarios, such as are shown in FIG. 4. As illustrated in FIG. 5, alert types may be broadly segregated into two groups. A first group 502 of alerts may be coached on the basis of a single observation (uploaded IDMS alert). A second group 504 of alerts may be more typically coached on the basis of a number of alerts of the same type. The distinction between the first group 502 and the second group 504 may correspond to a cut-off line in an ordering of alert type by decreasing intensity, starting with a severe High-G event type 506, which may correspond to a crash (collision). Such an event may be the subject of immediate coaching and may often be the subject on an urgent response. Accordingly, a response to a severe High-G event may include utilization of accident reporting tools.

One level down in FIG. 5 is a moderate High-G event type 508. A moderate High-G event may be distinguished from a severe High-G event based on an intensity of an inertial trace. A moderate High-G event may correspond to a collision, but in comparison to a severe High-G event, may have a higher prevalence of false alarms. Accordingly, the occurrence of a moderate High-G event may trigger the use of methods and tools that may facilitate investigation of putative accident context. This review may be used to verify that an accident occurred. The review may also be used more broadly to provide additional context around a verified accident.

The third level from the top of FIG. 5 illustrates a Hard Braking event type 510. Events of this type may indicate that a driver came to a sudden stop. Accordingly, these events may correspond to a "near miss," which may be considered a collision that almost occurred, but which the driver was able to avoid due to a hard brake. These events are often effective coaching examples.

The fourth level down from the top of FIG. 5 includes a number of detectable driving event types that may indicate a policy violation by a driver. These event types may be considered as members of a collective policy violation type 512, or may be considered individually, for the purposes of "bucketizing" alert types. Examples of such policy violations include failure to wear a seatbelt, certain forms of driver distraction such as texting on a phone, crossing a railroad without coming to a complete stop, or performing a U-turn.

Other unsafe driving events that may be categorized as "instantly coachable" may include severe following distance alerts, collision warnings, lane departure warnings, distracted driving, weaving, and certain traffic light, or stop-sign. It should be understood that this list is illustrative, and that different embodiments may incorporate more or fewer alert types, different severity ranking, and different combinations in comparison to the alert types and ranking illustrated in FIG. 5.

One severity level down from "instantly coachable" may be a group 504 of detectable driving behaviors that correlate with accident risk, but that are so frequent that it may be impractical or ineffective to respond to each occurrence. Examples of such alerts are illustrated at the bottom of FIG. 5. These may include Hard Acceleration, Hard Turns, minor Traffic Light violations, minor traffic sign violations, moderate following distance alerts, and minor speeding violations. In some embodiments, rather than triggering the creation of a coaching session on the basis of a single event, these driving behaviors may be addressed based on alert frequencies, identified patterns of non-compliance, and the like, as described below.

According to certain aspects, a virtual safety manager may be configured to accumulate examples of such alerts and then schedule coaching sessions in a periodic, rather than reactive, fashion, for example, after a certain number of such events have been observed, or at a time when a rate of observing such events exceeds a threshold. In this way, observations of driving behaviors that are of interest, but that are too common to be profitably addressed one at a time, may be incorporated into a more proactive and predictive approach to improving safety metrics at the fleet.

Figure 6:
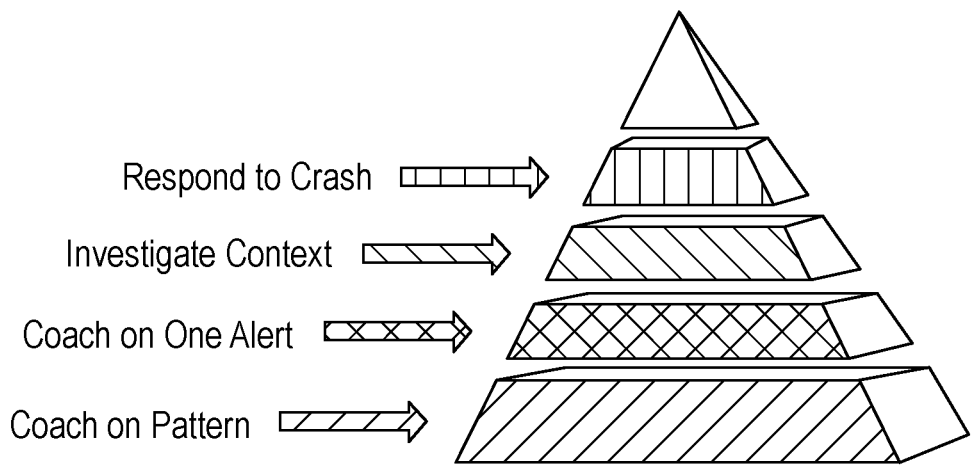
FIG. 6 illustrates an example of a safety pyramid and response types in accordance with certain aspects of the present disclosure.

FIG. 6 illustrates a stacked pyramid that corresponds to a common observation in safety-related fields. At the top of the pyramid are fatalities and serious accidents. Going down the pyramid are layers corresponding to minor accidents, near misses, and unsafe acts. The pyramidal shape is meant to convey the ratio of occurrences of these types of events. While the precise values of the ratios often vary in different fields, fatalities are less commonly observed than are serious accidents, which in turn are much less commonly observed than minor accidents. In some fields, the ratio between fatalities and serious accidents may be the same or close to the ratio between serious accidents and minor accidents. Furthermore, minor accidents are much less common than near misses. Finally, near misses are much less common than unsafe acts. Put another way, a driver safety monitoring system may be expected to make many more observations of unsafe acts than serious accidents.

On the left of FIG. 6 is an illustration of the different levels of alert types that are illustrated in FIG. 5, as they may relate to the safety pyramid layers. These layers may further reflect a typical urgency of a coaching response. Near the top of the pyramid, the urgency of coaching may be superseded by an urgent need to respond to the crash itself. For minor accidents, an initial focus may relate to investigating the context of the accident. For near misses, the highest priority response may be to formulate and communicate a coaching session on the basis of the observed alert. For unsafe acts, rather than formulating a coaching session on a single observation of an unsafe act, it may be more profitable to wait and see whether the driver exhibits a pattern of similar behaviors which would warrant the scheduling of a coaching session.

According to certain aspects, a virtual safety manager may assemble a subsample of alert video data associated with each of one or more common alert types. Techniques for choosing particularly "coachable" events from each subsample are disclosed below in the section entitled, "Selecting which video examples may be effective for coaching."

Examples of detectable driving behaviors that correlate with a relatively low level of accident risk, such that they would be coached more profitably on the basis of patterns of the behavior rather than individual events, may include failing to come to a complete stop at a stop sign, certain moderate traffic light violations, maintaining less than two seconds of following distance to a vehicle ahead on a highway, excessive lane changes, and moderate speeding. It should be understood that this list is for illustrative purposes, and that for some embodiments, certain driving behaviors may be grouped with instantly coachable events instead. For a given fleet operator, for example, maintaining less than two seconds of following distance may be considered a major breach of a company policy. A system enabled with certain aspects of the present disclosure may be configured for this fleet so that a detection of such an event will trigger an urgent response.

When considering the variety of detectable driving behaviors that correlate with accident risk, it may be useful to focus coaching resources on driving behaviors that have been identified by published safety statistics, by polling the opinions of experienced drivers, highway patrol officers, safety managers, and the like. It has been observed, for example, that for some fleets the most common accidents involving a second vehicle are, first, collisions at intersections and, second, rear-end collisions. In addition, it may be observed that other types of accidents, such as rollover, are comparatively rare, but also more often associated with serious injury or even fatality when they do occur. Lastly, there may be minor accidents, such as colliding with a static object at a slow speed in a warehouse parking lot, that are more common than accidents occurring at intersections, but which account for less loss overall. National statistics, such as statistics published by the American Transportation Research Institute, may generally support these observations. A virtual safety manager may select (prioritize, rank, etc.) which driving behaviors to coach based on these observations about correlations with accidents and magnitude of loss.

In some embodiments, data observed by installed IDMS devices may provide a more granular view into correlations between driving behaviors and accident risk. From previous observations with similarly outfitted vehicles (carrying similar loads, travelling in similar weather conditions, and the like), it may be determined that a given behavior increases (e.g. by a factor of two) the chance of an accident. Likewise, the collection of millions of miles of IDMS data may reveal that the most common accidents for a fleet having a given profile are different from published statistics of national trends. For a particular fleet, rear-end collisions, followed by improper lane changes, may be the two most common sources of accidents.

Based on a view of risk that is matched to a profile of a fleet, a virtual safety manager may determine that a related driving behavior alert should be prioritized for coaching. In the example of the fleet for which rear-end collisions are the most common accident type and/or most costly accident type, the virtual safety manager may preferentially select following distance alerts for coaching, since the frequency of rear-end collisions may be lessened as a result of focused coaching on adequate following distance. In another example, a virtual safety manager may recognize that speeding events in a construction zone may be associated with abnormally high risk and may therefore select speeding in a construction zone as a driving behavior that should receive a greater allocation of coaching resources.

Another technique for determining which driving behaviors to coach may involve determining a correspondence between a detectable driving behavior and a familiar coaching system. A familiar coaching system may refer to a coaching system delivered primarily in a classroom setting, perhaps with a limited amount of ride-along coaching in which a coach spends a day in a driver's passenger seat providing direct and immediate feedback to the driver. In one example, a coaching system may include a teaching that drivers should maintain at least four seconds of following distance at all times. A virtual safety manager, according to certain aspects of the present disclosure, may then select following distance alerts as a focus for coaching because following distance alerts are related to the teaching that the drivers previously received in a classroom setting. In one example, following distance alerts may be selected for face-to-face coaching sessions with greater probability because they are associated with a familiar coaching system.

In another example, a virtual safety manager may configure an IDMS to generate an audible beep whenever a driver is maintaining a following distance of 1.2 seconds or less. In this way, a virtual safety manager may improve upon even the most time-intensive form of face-to-face coaching, the ride-along. First, the virtual safety manager may operate at all times, not just one day (the day of an in-person ride-along). Second, the virtual safety manager may provide more consistent feedback because of its inherent ability to generate feedback according to precisely quantified criteria. In contrast, a human coach in a ride-along situation could not be expected to accurately provide feedback to a driver whenever the driver's following distance was less than 1.2 seconds.

Continuing with this example, a virtual safety manager may be configured to adjust notification thresholds depending on additional factors. An IDMS deployed on a vehicle that is hauling heavy cargo, such as cement, or hazardous cargo, such as fuel, may be configured so that a real-time following distance notification is set at a relatively higher threshold. For example, a driver of a cement truck may receive an audible beep whenever the following distance is less than 6 seconds. In some embodiments, the notification thresholds may vary over the course of a single day, depending, for example, on the weight of cargo being hauled. In this way, a virtual safety manager may provide tailored feedback to a driver that effectively reminds him or her of the current safety demands of his job. Accordingly, in some scenarios, the virtual safety manager may be considered to perform a continuous supervisory function. In such scenarios, the likelihood of human error based on temporary inattention may be mitigated.

Another example of a correspondence between a detectable driving behavior and a familiar coaching system may relate to stop sign behavior. Some teaching systems may advocate for coming to a complete stop a number of feet before a stop sign. An IDMS may include rolling stops at stop signs among its list of detectable driving behaviors. Accordingly, a virtual safety manager may select rolling stops at stops signs as a prioritized behavior for coaching by virtue of its correspondence to the familiar coaching system. In this example, a driver may be presented with example data from the recent past when he rolled through a stop sign. Such video may be presented to the driver as an example of a failure to observe the teaching system's instruction that drivers should stop a number of feet before the stop sign. In this way, individual instructions or recommendations of a teaching system may be monitored and automatically reinforced over time, which may extend the safety benefit of such teaching programs.

Another example of a correspondence between a detectable driving behavior and a familiar coaching system may relate to lane change behavior. In this example, a virtual safety manager may select, as a focus for coaching, examples of lane changes that a driver performed with or without checking mirrors in the direction of the lane change.

Another example of a correspondence between a detectable driving behavior and a familiar coaching system may relate to approaching intersections for which a green light has been illuminated and within the field of view of the camera for more than a threshold period of time. According to certain coaching systems, a driver should reduce speed in these situations, in anticipation that the green light might turn yellow and then red before the driver makes it to the intersection. In this example, a virtual safety manager may be configured to collect statistics of speed profiles in the presence of visible green traffic lights. Accordingly, the virtual safety manager may select this aspect of traffic light behavior as a focus of coaching resources.

Another technique for determining which driving behaviors to coach may involve determining a correspondence between a detectable driving behavior and a company policy or a priority. In some embodiments, selecting which driving behaviors to coach may be based on particular concerns of the fleet. Examples of particular concerns may include the types of cargo that the fleet tends to carry, whether they transport passengers, whether they offer expedited shipping services, and the like. Alternatively, or in addition, concerns of the fleet may be based on preferences of the fleet managers that may or may not be articulated. In accordance with certain aspects of the present disclosure, a virtual safety manager may be configured so that detectable driving behaviors that are of heightened concern to the fleet may be more likely to form the content of coaching sessions with drivers.

Company policies that may be identified and therefore serve to explicitly configure a virtual safety manager may include a particular setting or settings for following distance alerts, the acceptability and/or manner or participating in phone conversations while driving, eating while driving, relying on self-driving functionality of an equipped vehicle, and the like.

Furthermore, a virtual safety manager may be configured to be adaptive to interactions by fleet managers, so that it learns to recognize which driving behaviors safety managers tend to flag for coaching. In this way, a virtual safety manager may learn which driving behaviors are of heightened concern without having been explicitly configured as such by a human operator. In this way, among others, a virtual safety manager may be considered adaptive.

An adaptive virtual safety manager may ensure consistency in certain domains of coaching judgement for which human coaches may find it difficult or impossible to reach the same level of consistency. Certain coaching decisions may be based on a policy that includes certain parameterizations of driving behavior that may not be naturally determined in a quantitative sense by a human visual system. For example, the fleet may have an articulated policy around choosing whether to stop at a red light or to continue through a red light, that depends on how safely the driver could have come to a complete stop in time before the intersection. Such a policy may be inconsistently applied to different factual scenarios by different human operators tasked with judging alert videos of putative red-light violations. In a decision-function sense, there may be a sizeable "grey area" in the parameter space in which some human coaches may have determined that the driver made the correct choice in the situation and while other coaches may have determined the opposite. In these situations, an adaptive virtual safety manager may learn the dimensions of this "grey area" and as a result apply a fleet's policy regarding, for example, tradeoffs between safety and traffic light compliance, in a more uniform fashion across the fleet.

In some embodiments, selecting which driving behaviors to coach may be based on concerns of the fleet that are transient or seasonal in nature. In one example, a fleet may desire to hold a "safety blitz" whereby the bonus structure for a fleet may be based in part on an identified target driving behavior. For example, some detectable driving behaviors have both negative and positive aspects, such as following distance. When a third party cuts off a driver, but the driver continues to follow the third party for an extended period of time, a negative following distance alert may be triggered. If, however, the driver had slowed down to let the other vehicle safely merge, a positive "Driver Star" may be triggered. During a safety blitz for this type of behavior, driver's may be coached more frequently based on both of these aspects, that is, with a mixture of positive and negative reinforcement.

Certain other concerns of a fleet that may be transient or seasonal in nature may include coaching regarding the proper way to deal with animals on the road. For example, prior to deer season, the fleet may devote more coaching resources to emphasize safe responses to the sudden discovery of a deer in the road. In one example, drivers may be coached to brake when possible but to avoid a sudden swerve. Likewise, behaviors associated with night-time look ahead distances may be emphasized.

In some embodiments, a fleet may enable a virtual safety manager to incorporate learnings from other fleets. In one example, a virtual safety manager may be configured to learn that certain behaviors should be coached with greater emphasis at different times of year, such as the example just described. In this way, a virtual safety manager may dynamically adjust the weightings of how much different coaching behaviors should be emphasized based on seasonal concerns.

Just as a virtual safety manager may dynamically adjust based on seasonally relevant behaviors, a similar mechanism may enable a virtual safety manager to cycle through safety concerns that tend to remain at a low priority level throughout the year. For example, a driving behavior that has been relatively de-emphasized for a long period of time may become highly emphasized based on the amount of time since it the subject of focus. Furthermore, a virtual safety manager may transiently allocate substantial resources to the same behavior, since coordinated coaching of many drivers at the same time may create network effects whereby drivers and safety managers learn from and teach each other.

Another technique for determining which driving behaviors to coach may involve determining a correspondence between a common trip profile of a fleet or a driver and a coaching template configured for a fleet or driver type. For example, a virtual safety manager may have coaching templates that correspond to different typical cohorts, such as consumer ride-share fleet drivers, new teenage drivers, long-haul or short-haul commercial drivers, city couriers, emergency vehicle drivers, and the like. In addition, a fleet or driver may self-identify as belonging to a group for which a template is available. In some embodiments, the virtual safety manager may determine such a characterization. In either case, an association with a coaching template may refine the adaptivity of the virtual safety manager. For example, the virtual safety manager as applied to one fleet may be more heavily influenced by coaching response trends observed in other fleets associated with the same template.

Another technique for determining which driving behaviors to coach may involve determining a correspondence between driving behaviors that can be detected and driving behaviors that can be effectively improved with coaching. For example, a virtual safety manager may be configured to focus on areas where the largest improvements are possible. These areas may be ones for which the fleet's drivers are underperforming, because behaviors for which the fleet is already exceeding performance targets may not be readily and/or significantly improved. This approach may be informed by summary statistics of previous coaching data which may indicate that certain behaviors are generally not amenable to significant change. In this way, the virtual safety manager might first focus coaching resources on behaviors that are both risky and amenable to coaching, and thereby yield the highest return on the present expenditure of coaching resources. In such an embodiment, the virtual safety manager may cycle to more difficult to coach driving behaviors after a certain baseline performance on other safety metrics is achieved.

Selecting which Drivers to Coach

Embodiments of certain aspects of the present disclosure may include methods of automatically selecting which drivers to coach, which may include ranking drivers based on coaching need, categorizing drivers into groups that include "schedule for coaching" and "do not schedule for coaching at this time" and the like. Selection techniques may include reactive selection, such as responding to a collision as described above, for which the selection of which driver to coach is typically the driver who was involved in the situation that demanded a response. Selection techniques may also be directed to measures of driving behavior that are predictive of accident risk. As described herein, such measures may include a driver's score (which may be a GREEN-ZONE™ score), may include measures reflective of score components, specific behavioral trends, and the like. These metrics may correspond to a driver's compliance with various traffic rules, company policies, and the like. At a timescale that may be considered intermediate, between an immediate or urgent reactive response to an accident and a more deliberately scheduled response based on metrics that are predictive of future risk, a driver may be selected for coaching based on a notification of a positive or negative change in a driver's score. As explained below, the responses to such notifications may differ from responses to urgent collision situations, in that responses to such notifications may be more influenced by the degree to which coaching/manager bandwidth is available at the time. Furthermore, in some embodiments of certain aspects of the present disclosure, selection of which drivers to coach may be based on data sources that vary on a longer timescale. For example, a driver selection module of a virtual safety manager may incorporate lifetime learning metrics. Such metrics may include metrics reflective of the opportunity for change, based on whether the driver might be in a trajectory of habit formation and solidification. Further, driver selection may be based at least in part on the experience levels of drivers within the fleet, driver's personality trait metrics which may reflect a general receptivity to coaching, and the recency of involvement by the driver in one or more driving events belonging to a particular class/type.

Coaching resources, particularly ones that include an expenditure of time by a human coach or manager, are often a consideration in the execution of a driving fleet safety program. A virtual safety manager may more efficiently allocate the expenditure of coaching resources by prioritizing among drivers in a fleet, so that the limited coaching resources are applied to the drivers for whom coaching may be expected to have the greatest impact. Furthermore, a virtual safety manager, by selecting, or facilitating the selection of, drivers that should be coached, may remove problems of selection bias.

As referred to above, one source of selection bias may arise from issues unrelated to driver safety habits. For legacy systems in particular, sources of selection bias may be rooted in quality of the device installation, coupled with the legacy system's reliance for event detection on a low precision inertial-based trigger followed by human review. Coaching attention may be inadvertently restricted to a subset of drivers in a fleet that are associated with devices that are likely to trigger a false alarm (or the opposite), depending on data upload constraints. In some configurations, false alarms may effectively squeeze out detections of unsafe driving from the same driver. In another configuration, false alarms from one device may effectively squeeze out relevant data uploads from another driver of the same fleet with whom a data allocation may be shared. In either case, legacy systems may have a selection bias problem rooted in a tendency to trigger false alarms for a device.

Other selection biases may be rooted in human judgments. In one example, a fleet's safety manager may experience pressure regarding the documentation and coaching for safety concerns associated with certain drivers. For example, a driver may be a family relation to a fleet owner, a safety manager, and the like. In some cases, preferential treatment of certain drivers may rise to a level of nepotism, which may have an effect of ignoring certain safety risks or over-reacting to certain safety risks, based on biased human judgements concerning the selection of which drivers should be coached.

A virtual safety manager may generate a list or ranking of drivers to be coached for a fleet. Selection criteria may be based on configurations set by the fleet, such as by a safety manager. Further, it may be based on a driver score, so that the list of drivers to be coached includes all drivers having a GreenZone score that is below a set threshold.

Figure 7:
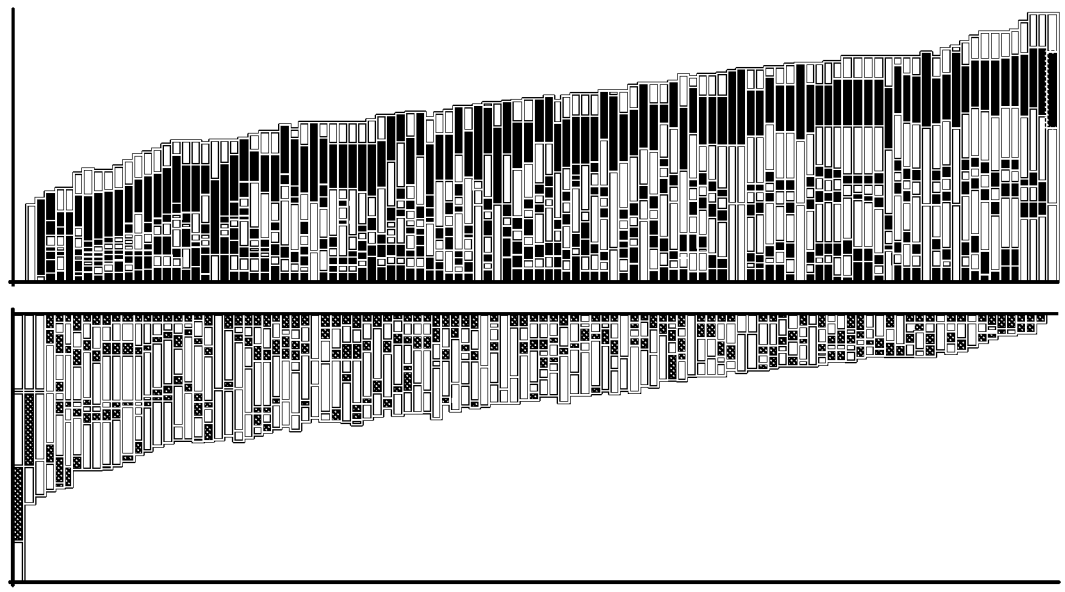
FIG. 7 illustrates an example of a driver score ranking in accordance with certain aspects of the present disclosure.

FIG. 7 illustrates ranked GreenZone summary and component scores for a number of drivers in a fleet. In this illustration, the composite of each stacked bar in the top panel corresponds to a driver's GreenZone score. Each section of the stacked bar corresponds to a score component. For example, the top stacked bar may correspond to the points that the driver earned for following distance behavior in the reporting period. The next stacked bar may correspond to the points that the driver earned for stop sign behavior, and so on. The stacked bars on the bottom panel indicate the corresponding "loss" for each GreenZone component. The right-most driver in this FIGURE only lost points on one aspect of driving. The next two drivers each lost some points in two different aspects of driving.

In some embodiments, the drivers to be coached may be all drivers having a GreenZone score less than a threshold in a given time period. In some embodiments, drivers may be selected based on whether they are in the bottom quartile of all drivers in the fleet with respect to GreenZone score. Of course, the number of drivers that are coached in a particular period may be matched to the availability of coaches.

Likewise, the selection of which drivers to coach may be based on a number of alerts for each driver organized by an alert category/type. For example, drivers who have exceeded a threshold number of alerts in a traffic sign compliance category may be flagged for coaching. Compliance levels expressed as a percentage of compliant driving actions based on the number of opportunities for a compliant driving action may also be used to select drivers for coaching. For example, drivers who failed to come to a complete stop at more than two percent of stop signs that they encountered within a month, may be flagged for coaching. In some embodiments, a virtual safety manager may facilitate the creation of a rule based on one or more data points and a comparator to a threshold, such as in the examples described above.

Figure 8:
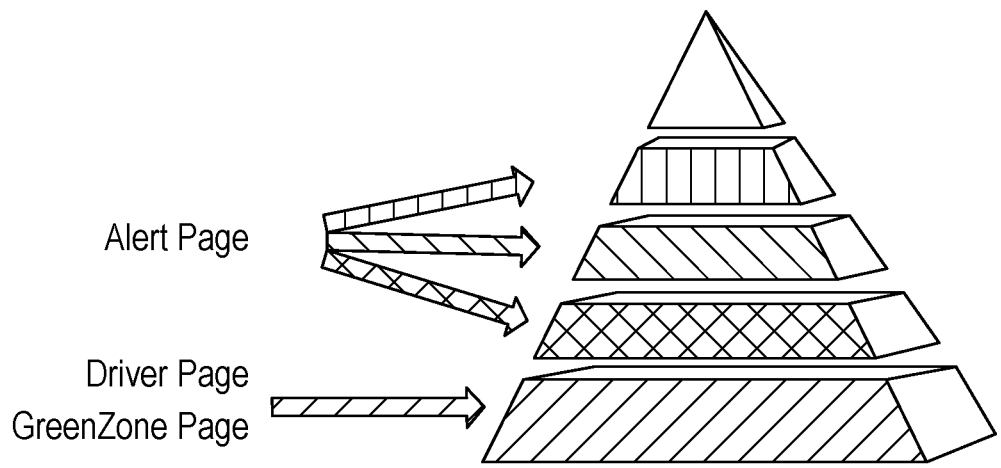
FIG. 8 illustrates an example of a safety pyramid and IDMS portal pages in accordance with certain aspects of the present disclosure.

FIG. 8 illustrates a safety pyramid like the one that is shown in FIG. 6, but with an indication of sub-pages in an IDMS portal which may be expected to be fruitful sources of coaching materials. For near-misses, minor, and major accidents, alert video data from single alerts may be accessed from an alert page. An alert page may include cards where each card corresponds to an observation of a single event. In some embodiments, a card on the alert page may correspond to a number of alerts that may have occurred within a single short clip of video data. For unsafe acts, which as described above, may be more profitably coached with reference to patterns of driving behavior. These patterns may be discerned with reference to a driver page (which may include alert counts, alert rates, and the like), and/or a GreenZone page (which may include summary driver scores for each of the drivers in a fleet.

In some embodiments, a GreenZone page may include an illustration of driver scores across the fleet such as what is illustrated in FIG. 7. Alternatively, or in addition, a GreenZone page may simply list drivers and summary score data. In some embodiments, a Driver Page and a GreenZone page may be the same page of an IDMS portal. For example, a combined page may list drivers, GreenZone scores, and other metrics of each driver, and may be sortable based on one or more columns, such as a GreenZone score column or a Stop Sign alert rate column.

In some configurations, selecting which drivers to coach may be subject to interrupt based on observed driving behaviors that demand an urgent response, as described in the previous section. When responding to an accident, for example, the driver who participated in or experienced the accident may be a typical choice for subsequent coaching. In some configurations, such as where the accident involves a geographical location having an increased accident risk, an observation of an accident may cause a virtual safety manager to reactively schedule a targeted coaching session with other drivers who are expected to drive through the same location.

In a typical embodiment of certain aspects of the present disclosure, a virtual safety manager may be configured to identify the drivers who are most likely to get into an accident in the near future. This list may be used to select which drivers should be coached. In some embodiments, the virtual safety manager may determine a risk of accident in a three-month period.

A determination of accident risk may be based on a combination of metrics which themselves may not indicate participation in an accident, but which may indicate participation in a driving scenario having increased accident risk. Metrics of this sort may include frequency and severity of certain IDMS alert types, including hard braking, following too close, hard acceleration and turning, excessive lane changes, swerving, and the like. These alerts may correspond to driving behaviors that a virtual safety manager may be configured to emphasize, as described in the previous section.

Accordingly, a virtual safety manager may identify drivers with higher accident risk by identifying the drivers in the fleet that exhibit the most unsafe behaviors that are known or thought to correlate with accident risk. The virtual safety manager may thereby facilitate the provision of coaching resources to these identified drivers.

In one embodiment, drivers may be selected based on a driver score, such as a GreenZone score. The virtual safety manager may sort the scores for each driver of the fleet to provide an initial assessment of who is doing well or who may need improvement. The virtual safety manager may then recognize those drivers that are doing well (either automatically, via a notification to a human operator, or via social coaching techniques described below, and the like), and may assign coaching to drivers with low scores.

Alternatively, or in addition, drivers may be selected for coaching based on alert trends. In this example, the virtual safety manager may sort a count, frequency (e.g. count per week), or rate (e.g. count per mile driven in a relevant setting) of high-risk alerts. Examples of such alerts, as described in the previous section, may include speeding, following distance, stop signs, and traffic lights. Identifying drivers with a high frequency of certain types alerts may be used to augment a selection based on a GreenZone score, which may be a summary score across multiple driving behaviors (across multiple alert types). Likewise, sorting may be performed based on individual or groups of factors that contributed to each driver's GreenZone score. Coaching may then be assigned to drivers who exhibit the highest number (or frequency, or rate, as described below) of particular driving behaviors, even if certain selected drivers have above average summary scores.

As just described, a fleet's riskiest drivers may be identified using summary scores of each driver. In one embodiment, a driver's score may be based on a raw count of observed unsafe behaviors. Alternatively, a driver's score may be based on a normalized count of observed unsafe behaviors, such as a count of observed unsafe behaviors that is normalized by a number of opportunities to exhibit such behavior, miles driven, period of time and the like. For example, a driver's score for stop sign behavior in a given period of time may be computed as a number of times that a driver rolled through a stop sign divided by (normalized by) the number of stop signs that the driver encountered in that period of time. In addition, observed unsafe driving behaviors may be weighted according to the severity of individual events in relation other events in the same class of events. Continuing with the stop sign behavior score example, the score may be weighted based on the speed at which a driver rolled through certain stop signs.

A driver's score, such as a driver's GreenZone score, may include multiple components. For example, in addition to a score component for stop sign behavior, described above, a second score component may reflect the driver's traffic light behavior. This component may be computed in an analogous fashion. For a given period of time, the number of times that the driver passed through an intersection when a traffic light corresponding to the driver's lane and direction of travel was red (a traffic light violation) may be divided by the total number of intersections with traffic lights that the driver encountered. Furthermore, individual traffic light violations that contribute to the summary traffic light component score may be weighted depending on a determined severity of the violation, where the severity may depend on the density of traffic at the intersection, the amount of time that the driver had to stop before the light turned red, the distance to the traffic light when it turned yellow or red, and the like.

In an embodiment in which a driver's score is comprised of multiple components, each of the components may be weighed differently in a manner that reflects a relative priority of the behavior. Continuing with the example above, a driver's score may include a stop sign component and a traffic light component. Considering that historical data may show that more accidents occur when a driver runs a red light than when a driver rolls through a stop sign, the traffic light component may be weighted more heavily. Accordingly, a driver's composite score may provide a summary metric that correlates with accident risk, accident risk weighted by expected loss, and the like.

Other driver score components may be based on continuous measures of driving compliance. For example, a speeding component score may consider the amount of time spent driving below a posted or fleet-specific speed limit. In some embodiments, the speeding score may be based on duration and severity of speeding normalized by the amount of time that the driver was travelling faster than 10 miles per hour less than the speed limit (to restrict the analysis to times that the driver could have been speeding). By normalizing in this way, a speeding score component may be more fairly compared across drivers who spend relatively more or less time in dense traffic when speeding is not even practical.

A driver score or individual driver score component may give fleet management a snapshot of a driver's level of risk for a time period being examined. A lower score may indicate a greater level of risk. Accordingly, drivers with the lowest driver scores may be selected with a higher priority when assigning coaching resources.

In some embodiments, a virtual safety manager may select drivers having the lowest composite driver scores in a time-period of interest, such as the previous week or month. Alternatively, the driver scores may be sorted based on a rolling time-window.

In some embodiments, a virtual safety manager may sort drivers from a subset of the fleet that reports to a particular dispatcher, coach, or the like. In this way, driver selection may be adapted to the availability of a particular dispatcher or coach.

Combining the driver's score and specific behavior trends when prioritizing driver coaching may facilitate a balanced selection of drivers with greatest overall risk, as well as specific risk related to certain behaviors. When only focusing on a driver's summary score, it is possible for a driver to have a high number of alerts in a certain category, yet not drop below a configured composite/summary score threshold. For example, a driver with a high overall score may habitually commit a policy violation, such as making an unauthorized U-turn. Therefore, a fleet may choose to incorporate both procedures, so that these types of isolated aspects of driving risk may be addressed. Likewise, reference to individual component scores may enable positive recognition of certain areas where an otherwise underperforming driver is performing well.

Another safety compliance concern may be seatbelt compliance. Seatbelt compliance may be a driving behavior for which a percentage of time spent driving while not wearing a seatbelt is a more relevant metric than individual observations of not wearing a seatbelt. Accordingly, a virtual safety manager may select drivers for coaching based on seatbelt compliance. In some embodiments, the virtual safety manager may augment a selection of drivers based on a separate consideration of seatbelt compliance. For seatbelts, it may be more effective to coach drivers specifically on seatbelt compliance behavior without reference to their overall driving risk. This approach may be based on the relatively low cost of delivering feedback to the driver about low seatbelt compliance statistics.

Additional compliance statistics may form the basis of targeted coaching campaigns. Selection of drivers for coaching based on percentage of complete stops at railroads, for example, may be incorporated into a virtual safety manager configuration for fleets that include school buses or that ship hazardous materials. Such fleets may be required to come to complete stops at all railroad signs. In this way, a virtual safety manager may select drivers who are not consistently observing a complete stop policy near railroad signs. As with seatbelt compliance, communication of this type of coaching may be performed with relatively low costs. In some embodiments, coaching around compliance may be performed in an automated fashion, as described in subsequent sections of this disclosure.

In some embodiments, a virtual safety manager may select drivers for coaching in a semi-reactive manner. For example, the virtual safety manager may flag drivers who exhibit an unusually low or high, or sudden change, of a composite driving score on a particular day. In some embodiments, this may correspond to determining and sorting driving scores on a relatively short time interval, such as hourly. Accordingly, drivers that are trending downward may be identified. These drivers may then be flagged to determine if the safety team should intervene with the driver during the same day. Likewise, a virtual safety manager could alert the driver that he or she is currently exhibiting a high score for the day, and thus introduce an aspect of gamification. For interventions that include a human manager making a call or sending a message, a virtual safety manager may throttle such notifications based on available manager bandwidth.

In some embodiments, a virtual safety manager may select drivers for coaching based on metrics that are calculated over a timescale that may be considered longer than a typically predictive selection of which drivers to coach. A driver selection module of a virtual safety manager may incorporate lifetime learning metrics. Such metrics may include metrics reflective of the opportunity for change. A determination that the driver's performance has slowly declined, for example, may indicate that the driver is slowly forming an unsafe driving habit. Accordingly, a virtual safety manager may attempt to schedule a coaching session at a time that is early in this negative habit formation, when the behavior may be more malleable.

Similarly, a driver's safety metrics may reflect that a driver is in a positive trajectory of habit formation and solidification. Selection of a driver for coaching may be based, therefore, on whether they are in a training period. Each driver may have a six month ramp up time during which they are being actively instructed on new habits associated with commercial truck driving. At such a time period, the driver may be expected to be more receptive to additional coaching to solidify safe behavior.

Another training period opportunity may occur soon after a driver was involved in an accident. While it may be important to coach on any behaviors that were exhibited around the time of the accident, as described above, it may also be recognized that the driver is more receptive to a broad range of coaching after experiencing an accident. Even an experienced driver might be receptive to additional coaching/training after being in a preventable accident.

Accordingly, a virtual safety manager may preferentially choose drivers for coaching based on whether they are likely to be in a receptive period in the weeks and months following an accident.

Another training period opportunity may be identified based on how quickly a driver improves performance during an initial training period. For example, a driver who quickly learns concepts in an intensive training program may also be quick to forget to employ them. Accordingly, a virtual safety manager may make predictions regarding when a driver's safety compliance performance is expected to begin to sag and may use this as a prior estimate in a detection of behavioral slipping. In this way, a virtual safety manager may select drivers for coaching depending on relatively small decreases in performance.

Likewise, a driver who slowly improves performance over the course of an intensive training period may continue to make steady progress after the coaching period as the training solidifies. Accordingly, a virtual safety manager may rotate coaching resources away from a driver who is steadily improving, even if the driver's score is below average, below a threshold for coaching, and the like.

In some embodiments, on-boarding coaching sessions, which may be considered coaching sessions scheduled within the first six months of a driver joining the fleet, may be a generally higher priority than continuous accountability coaching sessions, which may be considered coaching sessions scheduled for drivers who have been with the fleet for longer than six months.

Driver selection may be further based on which driving behaviors are prioritized for coaching, based on an observation that less experienced and more experienced drivers tend to need more coaching for different aspects of driving. Less experienced drivers may put themselves in positions of risk for which the risk level in a passenger vehicle may be small. For example, new commercial drivers may have a greater risk of rollover because they may be more likely to approach curves faster than is appropriate for a fully loaded truck. In contrast, more experienced drivers may develop strong habits that protect themselves from roll over risk but may be in greater danger of making errors relating to complacency. Accordingly, selecting drivers to coach may take into account the likelihood that a driver may benefit from a coaching session that is focused on a previously identified driving behavior of interest to the fleet, where that likelihood of benefit tends to correlate with a driver's experience level.

In some embodiments, a virtual safety manager may select drivers for coaching based on whether or not the driver has been coached before, and if so, how recently.

In some embodiments, a virtual safety manager may select drivers for coaching based on a driver personality assessment. In addition, selecting drivers for coaching may be based on an extent to which and/or how each driver interacts with a self-coaching smartphone app. For example, drivers who rarely interact with a self-coaching smartphone app may be more likely to be selected for coaching with a human coach or manager. In contrast, a driver who is acknowledging and watching self-coaching video content may be selected for face-to-face coaching relatively less frequently.

In some embodiments, a virtual safety manager may select drivers for coaching based on non-driving related reasons. In one example, a fleet manager may learn that the driver is experiencing family challenges, such as a death in the family or a divorce. In such situations, the driver may be selected for coaching so that the driver may get auxiliary support from his or her manager or coach.

In some embodiments, a virtual safety manager may select drivers for coaching based on a determination that a driver may have a higher than usual risk for leaving the fleet. For example, if the driver has the ability to choose when to work and has started to show an unusual pattern of accepting work, the driver may be at risk of leaving the fleet. In this case, the virtual safety manager may select the driver for coaching so that a human operator can possibly address other concerns that the driver may have with the fleet, or manager, and the like.

In some embodiments, a virtual safety manager may select drivers for coaching based on a recency of an alert. Empirical evidence may show that some alerts should be coached within one week to be effective. Observation of such an alert could then start a timer, so that coaching for the driver involved in the alert becomes more urgent as the desired coaching response time gets nearer. In this example, the virtual safety manager may take into account the bandwidth of the coaching resources, since there may be higher priority tasks to respond to first, but the priority of scheduling a coaching session with the driver in question may steadily increase. In addition, the weight of an urgent alert might drop off after a target period of time, reflecting that the coaching window has been missed. Further, such an alert might also be replaced by another, more severe (or at least slightly less severe) alert of the same type that occurs between the first alert observation and the first scheduled coaching session. The driver may then be coached on the newer alert, although the urgency of coaching would be higher than either one alone considering that the same coachable behavior is occurring within a short interval.

Selecting Video Examples Based on Coachability

Substantially continuous vision-based monitoring of driver behavior has the potential to generate an amount of coaching-relevant video data that may overwhelm a driver's or safety manager's ability to review. For example, during an initial phase of experiencing an intelligent driver monitoring system, a safety manager may appreciate the additional insights into aspects of driving behavior that were previously hidden. Soon, however, the availability of data may create new and different problems. Accordingly, certain aspects of the present disclosure are directed to dealing with an excess of video alert data. In this section, techniques for selecting among multiple available video examples are disclosed, including selecting types of alerts that are representative of the most common alert types experienced by the fleet, selecting individual alerts based on a weighting of descriptors, availability of supporting evidence, whether the alert example is representative of a targeted habitual behavior, correspondence with a familiar coaching system, whether the alert demands an urgent response, availability of comparison video data, and video selection techniques that are based in part on a profile of the driver being coached.

Embodiments of certain aspects of the present disclosure may include automated methods of selecting which video examples should be included in a coaching session with a driver. For the following techniques, coachability scores may be computed for each potential alert video. Alternatively, or in addition, potential alert videos may be categorized into broad categories, such as categories corresponding to a higher likelihood of being included in a coaching session or corresponding to a lower likelihood of being included in a coaching session. For example, a categorization may be made using a relatively low complexity processing technique, and a second pass scoring method having a higher computational complexity may be applied to alerts that were initially categorized as more likely to be included in a coaching session. In some embodiments, scoring of a newly observed driving situation (i.e. alert) may be based on a comparison of certain metrics against similar metrics that have been calculated for previously identified coachable videos.

Based on the techniques disclosed herein, a safety manager may be presented with a number of videos, for example 5 videos, that the virtual safety manager has determined are relevant for coaching. The safety manager may make a selection from this relatively reduced set. In some embodiments, a virtual safety manager may present coaching videos directly to the driver via a smartphone app, web portal, and the like.

In some embodiments, videos may be presented that are determined to be the most coachable video available for a given driver and for a given aspect of driving behavior. For example, the most relevant traffic light behavior video may include video in which the driver had sufficient time to come to a complete stop at a red light and yet failed to do so. The virtual safety manager may present videos in a hierarchical fashion, so that an interested driver may be presented with additional, yet less "coachable" videos, after watching the first. Likewise, as described below, the virtual safety manager may present an interested driver with video of similar scenarios in which the driver reacted in a different manner, in accordance with company policy, and the like.

In some embodiments, a virtual safety manager may present a driver with a summary view of driving behaviors and may not present video data to a driver at all, not initially, and the like. For example, an initial coaching screen available to a driver may indicate that the drivers score is "yellow" overall, where "yellow" may correspond to an intermediate value, and further, that the driver's score is "red" for speed and space management, where "red" may correspond to a more extreme value. In this example, the driver may acknowledge a coaching session that is based on a review of this more statistically presented snapshot of his or her behavior. In addition, a virtual safety manager may have coachable videos available for the driver to review that may illustrate examples of driving situations and/or driver reactions that contributed to the driver's score. For example, the driver may "drill down" into a particular behavior by pressing an icon associated with a component of his or her overall score—for example, a red bar for space management. In response, the virtual safety manager may display a representative video of the driver's behavior illustrating unsafe space management that contributed to the "red" summary assessment.

A technique for determining which video examples to select for coaching may include determining which alert types are most frequent for a driver that has been selected for coaching. As described in the previous section, drivers may be selected for coaching based on a summary driver score, such as a GreenZone score, which may indicate that the driver's safety performance is below a desired level in more than one area. Accordingly, a virtual safety manager may first determine which unsafe driving behaviors are most common for the driver. This determination may be further based on a severity of the behavior. For example, if the driver slowly rolled through a stop sign 100 times in a review period, and ignored a stop sign without slowing down 5 times in the same review period, the virtual safety manager may select an example of the driver ignoring the stop sign, since that is a more severe version of the same behavior. Likewise, if the same driver ran through a red light 5 times in the same review period, the virtual safety manager may select an example of the red light violation over the stop sign violation since it is a type of non-compliant safety lapse that may be more highly correlated with collision risk.

In some embodiments, a virtual safety manager may select the two or three most frequent alert types for a driver, then select two or three alerted events within each type and may add these to a coaching session. These coachable videos may be made available to a driver. In some embodiments, alerts may have been classified as "severe" or "moderate" based on rules and heuristics that were computed at the time of acquisition. In such cases, the virtual safety manager may be configured to exclusively consider "severe" alerts when selecting the most common alert types for a driver.

Another technique for determining which video examples to select for coaching may include determining a risk score for each candidate alert video. The risk scores may be calculated, for example, using a weighting of a preconfigured set of observable factors, as described below. In this method, risk scores may be sorted. The selection of video data for coaching may then include selecting the riskiest alert videos from the review period. Alternatively, or in addition, the virtual safety manager selection may be based on a distribution of safety scores, such that the selected videos are representative of a typical, e.g. average, risk, for the driver.

A weighting of a preconfigured set of observable factors may be based on a description of video data in a corresponding observations file. The observations file may be formatted, for example, as a j son file, in which image locations of other vehicles, locations of traffic control devices, states of traffic control devices, and the like, are stored for each of a plurality of image frames that were processed on a device near the point of image data capture. Based on this "textual" representation of the video data, the virtual safety manager may determine relevant coachability metrics, such as how closely the monitoring vehicle trailed another vehicle. This metric, which may be specified as a minimum following distance in time to another vehicle in the same lane or path or travel, may serve as a factor in a determination of a coachability score. In this example, a lower number may correspond to a higher risk of a collision, which may in turn correspond to a higher "coachability" score. Similarly, a coachability metric may incorporate a duration of an unsafe following distance. Other factors may include whether the driver changed lanes around the time of the unsafe following distance event, whether the other vehicle changed lanes to create the situation, and the like.

Continuing with the same example, a distribution of coachability scores for following distance may indicate that the driver tends to follow other trucks very closely, such as with a 0.2 to 0.4 seconds of following distance (time at which the driver may cover the distance to the next vehicle at his or her current speed), prior to making a lane change. In some embodiments, a virtual safety manager, recognizing this trend, may share video data in which the following distance was at a minimum over all detected events in the review period. Alternatively, or in addition, the virtual safety manager may present the driver with three example videos, one corresponding to a first quartile (which may be 0.2 seconds for the driver), one corresponding to a third quartile (which may be 0.4 seconds), and a third corresponding to a company policy (which may specify a minimum of 1.0 seconds).

For a coachability scoring method that incorporates multiple metrics, as described above, individual components of the scoring method may be weighted based on a heuristic.

Continuing with the same example, for a following distance coachability scoring method, minimum distance may have the highest weighting, the presence of a lane change may have the lowest weighting, and the duration of the following too close (i.e. tailgating) event at an intermediate weighting.

In another example of a coachability scoring method that incorporates multiple metrics, a virtual safety manager may select a representative video alert based on a correspondence with metrics for which the driver's variance is relatively low. In this way, the virtual safety manager can illustrate for the driver what he or she typically does. For some behaviors, this may be a more effective manner of coaching than showing the driver more extreme examples. Likewise, a mix of representative and extreme cases may be effective.

A coachability metric may score driving events in which tailgating or hard braking were observed, either alone or in combination. In this example, the following terms may be considered in determining a coachability metric for tailgating behavior: following_time_cv (coefficient of variation of the following time during tailgating), num_tg_in_minute, (number of tailgating alerts observed in the minute, this may be limited to tailgating alerts that were not determined to be caused by the other vehicle, which may correspond to a subset of tailgating event codes recorded the observation file), num_lane_change_per_video (number of lane changes detected in alerted minute), tailgate_duration (duration of each tailgate alert in seconds), following_time_min (minimum following time during a tailgating alert). These five factors may then be weighted with weighting coefficients w1, w2, w3, w4, and w5.

Likewise, the following terms may be considered in a determination of a coachability metric for hard braking: avg_speed (average speed of the vehicle before the period of braking), max_speed (maximum speed of the vehicle within a period of time, such as 30 seconds, of the detected hard braking event), alert duration (time period in seconds over which the driver was braking), and intensity_of_g (peak deacceleration of the vehicle during the hard braking event, in units of the gravitational constant, g). As with a tailgating metric, the terms of the hard-braking metric may be weighted with different coefficients.

FIG. 9 illustrates an equation that may be used to determine a coachability score of a severe tailgating event. In this illustration, there are five components, each of which has an independently configurable weighting. At the bottom of FIG. 9 is dictionary data structure that contains configurable weightings for each of several coachability score components.

As described above, certain driving situations may be considered "instantly coachable." Accordingly, in some embodiments, any alerted situation for which a coachability score is above a certain threshold (such as an "instantly coachable" threshold) may be uploaded to a remote server, may be transmitted to a driver for a subsequent coaching session, and the like.

A hard-braking severity metric may be based at least in part on whether the driver slowed suddenly in response to a vehicle, pedestrian, road debris, an animal, or other object, that has recently entered the driver's lane. In one example, hard-braking events for which the cause may be attributed to another object may be ignored for the purpose of selecting coachable videos. Alternatively, such alert videos may be stored and/or shared and recognized as an example of positive responsive driving. As with tailgating, hard-braking events may be filtered according to event codes in an observation file, where the event codes include event codes that indicate that a third party or object was the cause of the driving situation.

The above specifications of coachability metrics should be understood as examples. Other parameterizations and weighting schemes are also contemplated. Another formulation of a coachability metric may include one or more of the following factors: num_hard_brakings (number of hard braking alerts identified in the observation file), bh_avg_speed (the average speed in a time period before the hard braking event), inv_bh_following_time_avg (inverse of the average following time before the hard braking event), bh_max_speed (maximum speed before the hard braking event), alert_duration (duration of hard braking event), intensity (peak deceleration of the vehicle during the hard braking event), num_of_lane_changes_bh (number of lane changes before hard braking), num_of_lane_changes_after (number of lane changes after the hard braking event). The formulation may include a deduplication step so that multiple hard braking alerts that are triggered during the same driving event are merged. Furthermore, additional terms or processing steps may be tailored to identify and suppress known categories of false alarms. In addition, some weighting factors may be zero, indicating that the factor is not considered. Higher order terms reflecting combinations of factors are also contemplated. In some embodiments, a coachability score for following distance alerts may vary in an exponential fashion over a range of minimum following distances. This weighting may reflect a similar exponential relationship of historically observed collision risk. That is, because it may be observed that collision risk rises exponentially as a function of tailgating distance (e.g. $\frac{1}{2}^x$), a coachability score weighting of the minimum following distance may reflect this relationship.

Another technique for determining which video examples to select for coaching may include determining the availability of supporting evidence. A driver may exhibit a non-compliant behavior, such as speeding, at several times throughout the day. When bringing the non-compliance to the attention of the driver, the driver may dispute it. Accordingly, certain aspects of the present disclosure are directed to selecting unsafe driving videos for which there is supporting evidence contained within the same video.

In one example, among of video data captured at a time that a driver was speeding, a subset of the videos may include a visible speed limit sign. In this case, the videos having the speed limit sign may have a higher coachability score owing the presence of the evidence (the speed limit sign) that supports the focus of the coaching video (that the driver was speeding and should refrain from doing so).

Other forms of supporting evidence are also contemplated. For example, a traffic light violation may be preferentially selected if it contains evidence of the driver looking away from the intersection at the time that the light changed color, accelerating after the light turned yellow, and the like. In some embodiments, reference to signals available through an OBD J1939 port may indicate whether the brake was activated at any time as the driver approached the intersection.

Another technique for determining which video examples to select for coaching may include selecting video alerts that are representative of a common habit that should be broken. As described above, a driver's habit of closely tailgating another truck before passing that truck in the passing lane may be considered a habit that should be broken. In this example, the driver may habitually pass trucks in this fashion based on previous training. The driver may have been instructed that while passing a truck, one really should get close to the rear-end of the truck, so that he is not lingering in the left lane for too long during the pass. As a counterpoint, a safety manager for a fleet may prefer a policy that leaves a larger buffer in case the driver in front suddenly hammers the brakes. Even on a driver's best day, the reaction time may be about 1.2 seconds, including a cognitive response and a physical response. In addition, the safety manager may suggest that the driver's way of passing trucks adds unnecessary stress and tension, and furthermore, that backing off or going 5 mph slower may enable the driver to make more effective use of his or ELD hours. In such a coaching session, a virtual safety manager can assist the coach in changing the unsafe habitual behavior by selecting videos that are representative of the particular driving habit that should be addressed.

Figure 10:
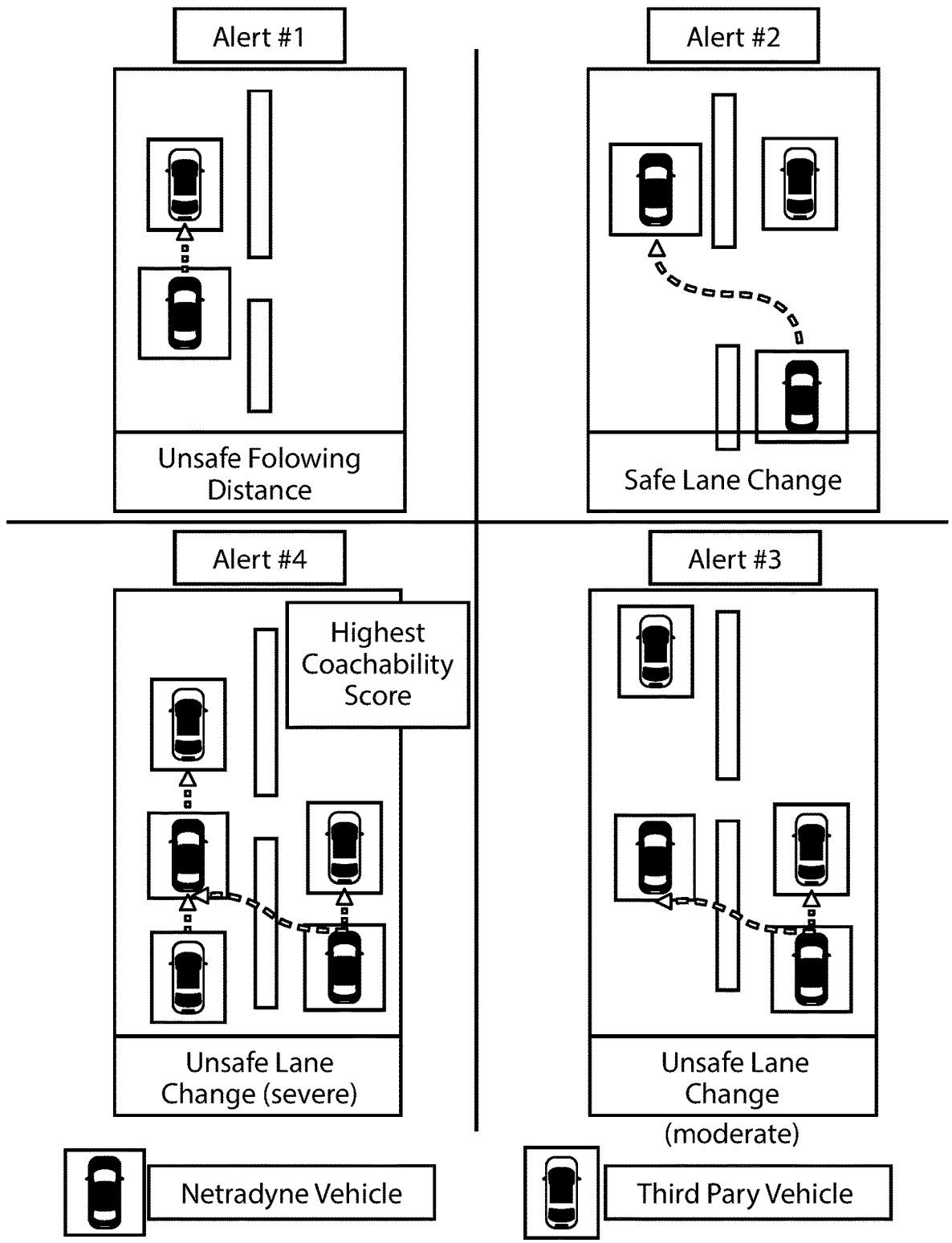
FIG. 10 illustrates an example of a coachability score determination method in accordance with certain aspects of the present disclosure.

FIG. 10 illustrates four driving situations that may be considered effective comparison alerts and events for each other. Alert #1 illustrates unsafe following distance, wherein a monitored vehicle (the Netradyne vehicle) is following close behind a third-party vehicle. Alert #2 is safe lane change event. This event may not be typically considered an alert. Rather, because the driver began making a lane change while there was still a sufficient safety buffer to the next vehicle, the driving event was not considered unsafe. Still, this alert video may be uploaded as a comparison to other alerts that are illustrated in FIG. 10.

Alert #3, illustrated in the bottom right corner of FIG. 10, illustrates a moderately unsafe lane change. In Alert #3, prior to the lane change, the driver of the monitored vehicle is positioned at an unsafe following distance to the driver ahead. This lane change may be considered unsafe because it was preceded by a brief tailgating event when the driver may have been exposed to greater risk than was necessary.

Alert #4 of FIG. 10 illustrates an unsafe lane change that is similar to the unsafe lane change illustrated as Alert #3 of FIG. 10. In Alert #4, the driver is not only tailgating before the lane change. The driver is also tailgating another vehicle after the lane change. Of these four examples, Alert #4 may be determined to have the highest coachability score. Alert #2 may provide a useful counterexample of how a lane change should be performed.

Another example of a coachable moment that may be indicative of an unsafe habit may concern a driver's gaze behavior upon entering a parking lot. A fleet may instruct drivers to scan parking lots upon entry to determine where poles or obstructions are located. This instruction may reflect a desire to avoid collisions with stationary objects in parking lots that could be avoided. Understanding that the driver may be concerned with navigating tight turns in a parking lot, avoiding smaller vehicles, and the like, the virtual safety manager may highlight examples of when the driver entered a parking lot but apparently failed to notice the presence of a pole or other obstruction.

Another technique for determining which video examples to select for coaching may include determining whether a comparison video is available for the same driver. A comparison video may be a video in which a similar situation has occurred, but for which the external circumstances played out differently. For example, in determining a coachability score for a red-light violation video, a virtual safety manager may search a corpus of previously recorded alert data from the same driver or from the same fleet (or otherwise available to the driver) for which many of the alert metrics were similar. For example, the driver in both videos was travelling about the same speed, the light turned red when the driver was at a similar distance to the intersection, and the density of traffic around the intersection was similar. In the comparison video, however, another vehicle entered the intersection from the perpendicular road and the driver was forced to take an evasive action. In this example, based on the availability of a comparison video that was similar in many respects, and which could, in effect, play out an alternative outcome, the target video may be scored with a high coachability score. Subsequently, the two videos could be shown to the driver together. The comparison video could be used to make the point that the driving behavior in the target video is associated with a higher risk of collision.

In some embodiments, a comparison video may be identified by use of a risk map, where a risk map contains historical accident data associated with different geographical locations, and may include, for example, normalized accident rates for different intersections. In some cases, a risk map may be organized in earth-centered coordinates. Alternatively, or in addition, a risk map may be organized according to parameterizations describing an intersection, time of day, time of year, weather condition, and the like. In one example, an alert video may have been captured near to a location where other accidents have been observed at a high frequency. By assigning a higher coachability score to alert videos that are captured in such locations, a driver may more naturally appreciate the potential consequences of unsafe driving behaviors. For example, an intersection with an unusually high accident rate may have a feature, such as an unusual angle to an intersecting road, that might make it clearer in the context of a coaching session that the behavior may increase the chances of an accident.

Another example where a virtual safety manager may select a pair of videos for coaching may include selecting two videos that were alerted for complementary positive and negative driving behaviors. When a vehicle needs to merge with through traffic on a highway, a driver may choose to slow down and let the other vehicle merge, or may take no action, even after the other vehicle enters the lane at an unsafe distance ahead of the driver. In these two cases, the former driver response may be classified as a DRIVER STAR, indicating that it is a positive driving behavior, while the latter driver response may be classified as a tailgating event. By showing both of the examples to a driver in a single coaching session, a driver may more readily appreciate the overall reduction of risk that accompanies a transient reduction in speed to let another driver merge.

Figure 11:
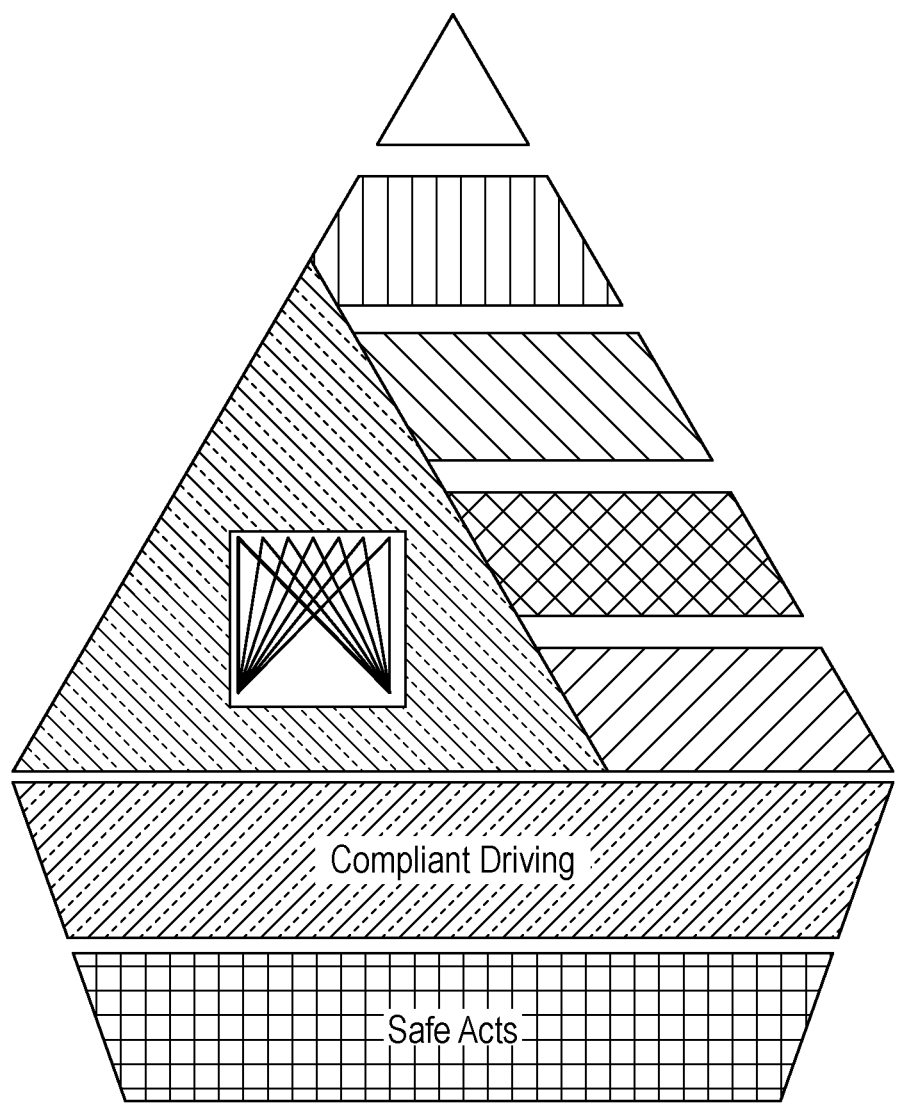
FIG. 11 illustrates an example of a modified safety pyramid in accordance with certain aspects of the present disclosure.

FIG. 11 illustrates a modified version of the safety pyramid described above. The shape illustrated in FIG. 11 includes two additional layers beneath the "unsafe acts" layer. These two layers may correspond to positive driving. The first layer may indicate observations of compliant driving. These may include, for example, times that the driver came to a complete stop at a stop sign, drove within the speed limit, drove at a safe following distance to other vehicles and the like. The bottom layer of FIG. 11 may correspond to above-and-beyond driving behaviors, such as DRIVER STARS, just described, which may be referred to as Safe Acts.

In one example, a driver who drives at an unsafe following distance may be considered to be exhibiting an unsafe act. For every 500 hours of driving at an unsafe following distance, for example, the driver may encounter 100 situations in which the traffic ahead slows down suddenly. Of these 100 situations, 85 may result in a near miss, 14 may result in a minor accident, and 1 may result in a serious accident. For a fleet with 10 drivers, each of these numbers may increase by a factor of 10. That is, across the fleet of 10 drivers there may be 10 serious accidents over the course of the combined 50,000 hours of driving at an unsafe following distance. Of the 10 serious accidents, 1 might be expected to involve a fatality.

While the above statistics, which are intended for illustrative purposes, may paint a bleak picture that serious accidents and fatalities are unavoidable, according to certain aspects of the present disclosure, risk of serious accidents and fatalities may be reduced. While a driver may be expected to be involved in one serious accident for every 500 hours of driving at an unsafe following distance, that driver can reduce the number of hours driven at an unsafe following distance by spending a higher portion of time observing a safe following distance. Furthermore, a driver can guard against unsafe following distance time periods by proactively creating space between himself or herself and a driver attempting to merge into the driver's lane. By recognizing DRIVER STARS, a virtual safety manager may shape a driver's behavior so that the "width" of the unsafe acts layer of the pyramid is reduced. The interior triangle having the NetraDyne logo illustrates behavioral observations after unsafe acts have been reduced to such a degree that the likelihood of a fatality across a fleet of drivers becomes vanishingly small.

Another example where a virtual safety manager may select a pair of videos for coaching may include selecting two videos in which the driver is driving alongside a lane of traffic in which vehicles are moving slowly. In this case, an uneventful relative speeding alert video may be paired with a second example in which a driver, possibly the same driver, was forced to brake suddenly or swerve after one of the slow-moving vehicles suddenly entered the driver's lane.

In the above examples, a virtual safety manager, by employing various methods of sorting and identifying coachable videos, may facilitate the communication of reasons why a driver should exhibit compliant driving behaviors. Furthermore, by automating these processes, the examples that are chosen are not only visual and explicit, but they may be highly personalized. The drivers' attention can be drawn to instances of unsafe driving in which he or she participated.

When making a comparison between recently observed behavior and earlier observed accidents or near misses, it may become clear how compliant behavior may reduce the likelihood of collisions and injuries. While the above examples describe a comparison between similar situations in which the driver took similar actions, a virtual safety manager may also reinforce positive and safe driving decisions by pairing alert video data in which the driver took a compliant action with a comparison video data in which he did not. Because it may be difficult to learn from an experience that could have occurred but did not, comparison videos in such cases may illustrate the alternative outcome associated with choosing non-compliant behavior. In this way, examples of compliant videos can be paired with other comparison videos to make a stronger point within the context of a coaching session.

In another example, a driver may be presented with a pair of hard-braking videos, a first in which there was enough of a following distance buffer to come to a complete stop and another in which there was not. Because not every driver would have been involved in an accident, a virtual safety manger may use the pairing function to pool the collective experiences of several drivers who work for the same fleet, within the same insurance pool, and the like. Furthermore, in some instances, a fleet and a driver may make a video of an accident available as a comparison teaching tool for other drivers.

When considering large amounts of data, a virtual safety manager may be able to illustrate how risk can vary in a situation. For example, a virtual safety manager may assemble a number of videos which illustrate a deficit in response times associated with a driver holding a smart phone. A collection of videos showing a distracted driver maintaining a constant speed after a light turns yellow, for example, may serve as a poignant illustration of what an impaired response time looks like.

In some embodiments, a virtual safety manager may include a database in which a set of hard braking events are stored along with a number of descriptive statistics. For example, a database of observed hard braking events may be queried to return events that match an event in question, such as with a minimum speed prior to hard braking of 45 mph, a change in speed of 10 mph over 5 seconds, and a distance to a vehicle ahead when that vehicle exhibits a sudden decrease in speed. With such a database, a virtual safety manager may identify a set of videos that may collectively illustrate the impact of driver distraction in a typical highway scenario. Such a database may be augmented in a number of ways. For example, fields may be added that indicate the presence or absence of vehicles in adjacent lanes that might limit the driver's options in the event that he or she would need to suddenly change lanes.

A virtual safety manager may likewise maintain database tables of other commonly encountered scenarios, such as intersections with traffic lights, intersections with stop signs, merge zones, highway off ramps, and the like. A database table concerned with merge zones, for example, may maintain fields of vehicle tracks relative to a driver, as well as indications of the location of a start and end of a merge zone, and the driver's speed. Such a table may then provide the basis for a data-driven assessment of whether the driver in any particular instance conformed to a typical or expected behavior. Accordingly, a virtual safety manager may query such a database to identify comparison videos for both positive and negative driving behaviors observed around merge zones.

Automatically Preparing a Coaching Session

In some embodiments, a coaching portal, which may be a webpage and/or a smartphone or tablet app, etc., may provide an indication of which drivers should be coached. As described above, a virtual safety manager may include a processor configured to sort alert videos by type, based on coachability, based on availability of supporting evidence, and the like. Based on these organized and identified coachable videos, a virtual safety manager may assemble a selection of video alert data in preparation for a coaching session. This final preparation for a coaching session may occur at a time determined by a scheduling module, described in the section below entitled, "Automatically scheduling a Coaching Session." When the coaching session is ready, the driver may receive a notification that new coaching data are available.

As described above, drivers may be sorted according to driver selection criteria aimed at efficient utilization of coaching resources. In light of available coaching resources, a coaching session may be created for the number of drivers that the available coaches may reasonably coach in a working day.

FIG. 12 illustrates example schedules of a coach and a safety manager. In some instances, the safety manager and the coach of a fleet may be the same person. In others, these two roles may be performed by different people. As illustrated in FIG. 12, the coach may prepare to coach and conduct a number of coaching sessions every day. In addition, the coach may schedule coaching sessions on a weekly basis. For example, the coach may schedule coaching sessions for the next week. Furthermore, the coach may complete and document coaching sessions from the current week on a weekly basis.

As further illustrated in FIG. 12, a safety manager may schedule monthly activities. A safety manager may review coaching summaries and identify and track risky drivers once per month. Likewise, the safety manager may measure or compile coaching effectiveness metrics on a monthly basis and communicate trends to other members of the organization.

In some embodiments, coaching sessions may be scheduled without reference to the availability of a coach. For example, coaching sessions may be automatically generated and communicated to drivers without requiring input or acknowledgement from a human safety manager or coach. For drivers who are automatically sent coaching data, the coaching data may be delivered at a scheduled time, as described below. In addition, for such drivers a safety manager may choose to check in with drivers to review the self-coaching system periodically. In such embodiments, the scheduled weekly or monthly activities described with reference to FIG. 11 may be performed in a substantially continuous manner.

Automatic preparation of a coaching session may include "auto-adding" alerts. In some embodiments, a coaching portal may be configured for human coaching, but with auto-adding. In this way, coaching sessions may be prepared in an automated fashion, but may be scheduled at a later time based on availability of a human coach or other considerations.

In one example, a number of high-risk alert types may be identified according to methods described in the above section entitled, "Selecting which driving behaviors to coach." For each of the high-risk alerts identified, the virtual safety manager may be further configured to prioritize moderate and/or severe alerts and may optionally include positive driving behaviors such as Driver Stars. Driver Stars may give the coach an opportunity to review positive behavior with the driver which may balance the conversation in face-to-face or telephonic coaching sessions. Likewise, the inclusion of Driver Stars may improve the effectiveness of an automated coaching session by improving a driver's engagement with the app. Alternatively, or in addition to a smartphone app, a driver may receive coaching session video data via a web page, a dedicated coaching device, and the like.

A coaching session may be prepared in an iterative fashion. Whereas coachable videos may be queued so that a coaching session is ready to be scheduled, the coachable videos may also be removed or re-prioritized based on other factors, as described in the section above entitled, "Selecting video examples based on coachability." A safety manager or coach may also manually review queued videos and may make adjustments to the selection of videos that may be shared with the driver in a coaching session.

As described above, the video alerts that are queued in a coaching portal may be representative of the most frequent alerts for the driver, may include Driver Star videos, and may include other personalized examples from the driver's recent history that are particularly coachable, meaning that they clearly make a driving safety related point. A human coach or safety manager may review the assembled videos based on these criteria to ensure that the virtual safety manager has selected videos according to these qualitative criteria. Using a learning algorithm and based on the adjustments made by a human coach via the coaching portal, a virtual safety manager may be trained to make better selections of alert data over time. That is, a virtual safety manager system may be subjected to a training regimen wherein the selections and adjustments made by a human coach may be applied as a teaching signal.

One advantage of configuring a virtual safety manager to prepare coaching sessions is consistency. By auto-adding alert data according to pre-configured data, a coaching session may be thought to focus on just the facts. This approach may obviate adversarial debates between a coach and a safety manager, because the safety manager can simply ask the driver what he or she thinks of the facts as they were identified by the automated system. In this context, a defensive reaction may be avoided. A coach may be enabled to engage the driver as an advocate who is finding ways for the driver to improve performance, earn an increased bonus, and the like. In addition, a safety manager can ask more pointed questions, such as why a driver took a U-turn in an unsafe location and may remind the driver of better approaches to deal with missing an exit or getting lost. In this way, the virtual safety manager may become an externalized bearer of bad news, and a coach may be able to work with the driver on how best to adapt to and deal with the news.

According to certain aspects, a queued coaching session may include non-video data that may be incorporated into a coaching session. A prepared coaching session may include a driver score trend, which may focus on the last week and current month. The assembled data may include an indication that the driver is trending above or below the company's coaching threshold, if a coaching threshold is configured. Furthermore, the assembled data may include a previous coaching history, which may highlight any behaviors which may have been repeatedly coached.

A virtual safety manager system for automatically preparing a coaching session may include a processor configured to organize the relevant data sources identified above. A snapshot of the following information may be populated into a coaching session: the driver's score for the last week and the current month; if there are repeat behaviors, how often the driver has been previously coached for this behavior; safe driving principles; and/or company policies to be reviewed with the driver.

For an embodiment of a virtual safety manager that includes the use of a smartphone app, the driver may review coachable videos alone. In this case, the virtual safety manager may further populate a coaching session with an indication of the next scheduled safety meeting with a human safety manager, if one is scheduled.

Figure 13:
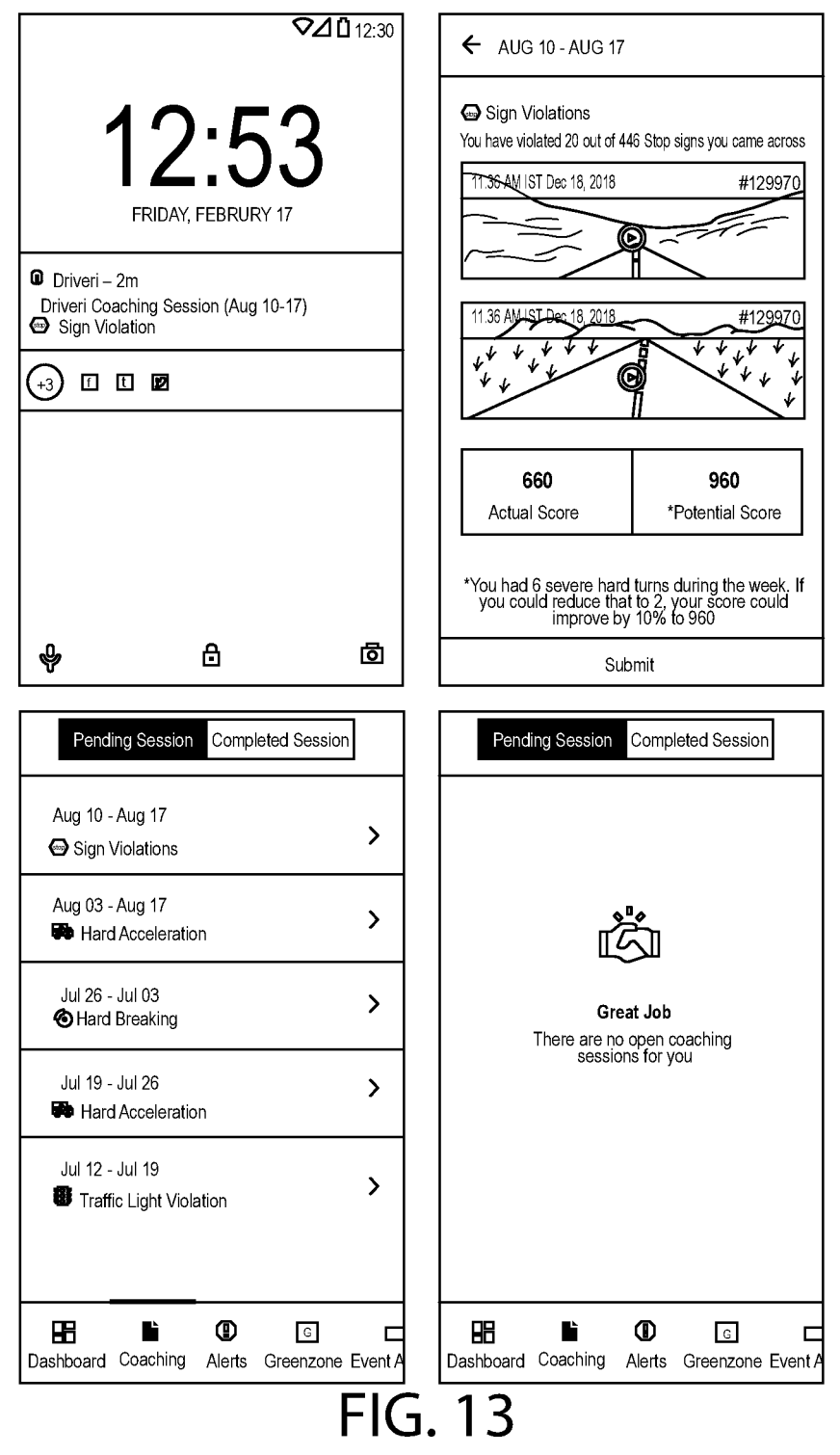

FIG. 13 illustrates screenshots of a smartphone app that embodies certain aspects of the present disclosure. The top left panel shows a home page notification in which the Driver is alerted that there is a Sign Violation alert that is the subject of a coaching session. In some embodiments, a notification to the driver may be as minimal as this type of home-screen notification. It may also be a text message. In such an embodiment, a driver may acknowledge the alert notification by deleting the notification message, pressing a button or hyperlink within the message, and the like.

Figure 14:
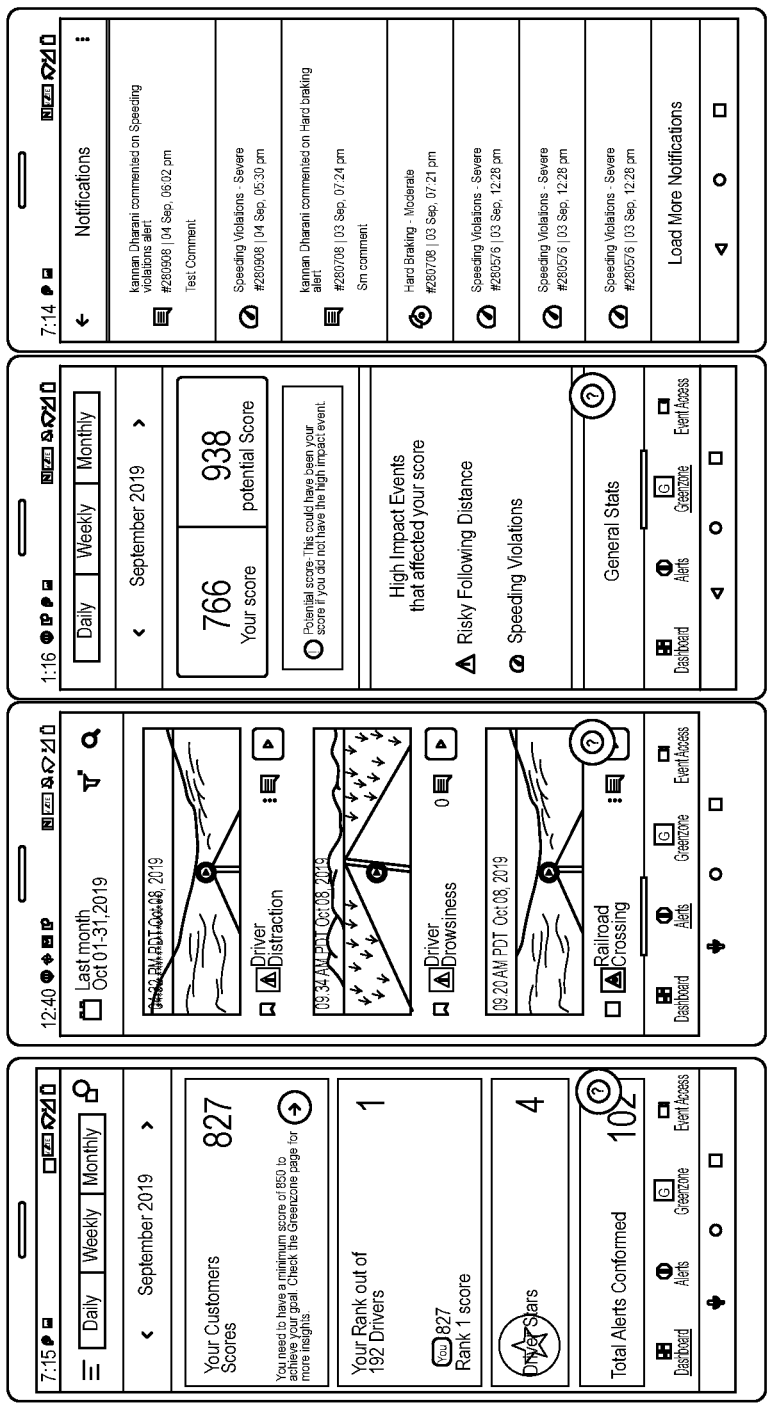
FIG. 14 illustrates an example of a Coaching App in accordance with certain aspects of the present disclosure.

The top right panel of FIG. 13 illustrates a view of a Driver App in which sign violation data may be presented along with other data, such as a GreenZone score, a potential score, and a textual message for the driver. The bottom left panel illustrates a pending session view which may act like an inbox of coaching sessions that the driver may review. The bottom right panel of FIG. 13 illustrates a view of Pending Sessions after the driver has reviewed all pending coaching sessions. FIG. 14 illustrates additional screens that a Driver may encounter within a Coaching App in accordance with certain aspects of the present disclosure.

A coaching session may be further populated with a clear textual explanation of which alert types/driver behaviors are the focus of the coaching session. For example, if following distance is the selected driving behavior for the driver, the coaching session may indicate this with text, or with an icon for following distance.

Furthermore, the coaching session may clearly indicate why the available videos were selected. Continuing with the example of following distance, if the selected video was meant to be representative of what the driver's average following distance looks like, the coaching session may include an icon of a bell curve with an arrow pointing to the center of the bell curve. Likewise, if the video is meant to be an extreme example that was unusually risky, the icon may be a bell curve with an arrow pointing to an extreme tail of the bell curve. In some cases, the horizontal axis of the bell curve may indicate an actual range of minimum following distance exhibited by the driver. Alternatively, or in addition, the bell-curve may be color coded with red and green regions indicating unsafe and target zones, respectively.

Some coaching may be based on compliance statistics, which may include ratios of compliant/safe behavior vs. non-compliant/unsafe behaviors in similar encountered situations (i.e. for driving behavior types). In some embodiments, a coaching session may include an indication of what average following distance for historically low risk drivers (that is, drivers who have proven to be involved in accidents at below average rates). For example, a bell curve icon may indicate a target following distance that corresponds to the average exhibited by these drivers.

Furthermore, a virtual safety manager may prepare some coaching sessions without assembling video data. Some behaviors, like the following distance just described, may be adequately presented with statistics, such as an annotated distribution of following distance. The presentation of compliance statistics may provide a counterpoint to coaching sessions that may be overly focused on atypical moments in time. Compliance statistics, instead, may reflect alert events that accumulate into patterns.

In some embodiments, a virtual safety manager may prepare a coaching session that includes general coaching messages that may apply broadly. For example, the coaching session may include a message explaining why some training may be helpful for every driver, based on facts about the human eye, and may include engaging observations. For example, a message may indicate that prior to the twentieth century, the human eye had never been in a position to adapt to travel faster than 20 mph. As such, all drivers should focus some attention on getting comfortable with the unnatural habit of looking as far off into the distance as may be considered safe when driving a fully loaded truck. In this way, a virtual safety manager may present a number of interesting "factoids" that may encourage driver engagement, based on messaging about how a driver can train himself to be able to properly respond in time, in the context of a program to train one's natural abilities and extend them into distinctly modern scenarios.

While much of the current subsection has dealt with preparing a coaching session based on a preconfigured review period, a virtual safety manager may also be configured to enable a rapid response to a collision, or other driving situation that may demand an urgent response. Rare events may be communicated to a driver or a safety manager in the form of a coaching session on an occurrence-by-occurrence basis. In some cases, the content of the coaching session may be tailored to the situation demanding an urgent response.

In accordance with certain aspects disclosed herein, a coaching session may be populated with video data from one or more minutes leading up to the collision. Upon detecting a collision, a virtual safety manager may trigger an automated request of video data from an edge memory drive. In some cases, the collision may not have registered a substantial impact with the driver's truck. For example, a third-party vehicle may have hydroplaned in front of the driver and lightly contacted the driver's vehicle before spinning off the road. In such situations, the virtual safety manager may enable a faster response to the collision by first determining when the collision occurred. A determination of the likely time of collision may be based on a determination that the truck came to a complete stop on a highway shoulder. In addition, a temporal localization may be further refined based on detectable but moderate inertial signals that may have preceded the truck coming to a complete stop.

In situations in which the driver has come to a complete stop following an accident, it may be helpful to transmit video data to the driver, e.g. via a smartphone app, as it becomes available. In some cases, the video data may be transmitted directly from the IDMS to a smartphone app, to a built-in display, and the like. Alternatively, or in addition, the video data may be transmitted to a remote server which the driver may access using a smart phone app. In either case, the availability of video data surrounding an accident may serve to make a police report more accurate. In such situations, additional coaching-specific data may be made available at a later time when the driver is in a better position to review the content of a more complete coaching session.

Automatically Scheduling a Coaching Session

Embodiments of certain aspects of the present disclosure may include automated methods of scheduling a coaching session. In some embodiments, a self-coaching (i.e. automated coaching) session may be automatically scheduled at an appropriate interval following the end of a period of driving. For example, after the driver ends driving for the day, a coaching session notification may be delivered to the driver's phone. Coaching data, which may be transmitted to a memory in the driver's app, or may be delivered as a link to a remote server, may be configured to arrive, for example, after the driver has been stationary for at least three minutes, indicating the start of a break or an end of a driving period. Similarly, a notification message, which may cause a pop-up message on driver's smartphone, may be configured to arrive 20 minutes after the driver started a break or end of a shift. In this way, a driver who may be interested in seeing feedback soon after completing a trip may access the coaching data by navigating to the coaching app on his cell phone. If the driver does not access the video within a configured time period, however, a pop-up notification may be triggered on the driver's smartphone, in-cab display, and the like. That is, if the driver does not typically seek personalized coaching video on his/her own initiative, a delayed pop-up notification or audible notification may serve as a prompt.

The timing of coaching notifications may be adapted to driver responsiveness over time, so that the coaching notifications are sent at times of the day, or times relative to the start or end of periods of active driving, that the system learns the driver is more likely to acknowledge and/or review coaching feedback.

For embodiments of a virtual coaching manager for which a human manager may participate in a coaching session, a virtual manager may likewise help schedule a coaching session with the driver. For remote drivers, similar to the timing of coaching in automatic mode, the virtual safety manager may predict when the driver is expected to complete a driving trip and would be available for a coaching session.

The scheduling of coaching sessions may be further based on the discussion (or self-coaching) topics and the expected reaction to the coaching. If a coach suspects that a driver may react negatively, then it may be more effective to schedule the coaching for the end of a driver's shift.

A scheduling function of a virtual safety manager may improve timeliness. For some coaching messages, coaching sessions should be completed within one week of the last alert noted in the coaching session. This timing may provide greater opportunity for the driver to recall what occurred, which may increase the impact of the coaching session.

In some circumstances, such as when a driver is exhibiting abnormally unsafe driving behaviors, appears sleepy, etc., the virtual coaching manager may interrupt a period of driving to deliver a message to the driver, or a series of messages that may escalate to a phone call from a manager. Other coaching sessions may be scheduled according to longer timescales. As described above, coaching that is intended to shape a driver's habits over an extended period of time may be scheduled one or more weeks in advance.

For Long Haul Drivers, a driver may be away from a central office for three or four weeks at a time. For these drivers, scheduling a periodic coaching session may have an added social benefit of ensuring that the safety manager is in contact with a driver. Accordingly, scheduling functions may take into account when the driver last called into any office. This factor may influence the scheduling priority of different drivers.

For a less than truck-load carrier, a driver may be expected to be at the terminal at some point every workday, either in the morning or in the evening. In contrast, drivers from truckload carriers may be out for days and weeks at a time. A virtual safety manager may simplify scheduling with a diverse set of drivers though integration with route scheduling and tracking. For example, if two drivers have substantially the same priority score for a face-to-face coaching session, a virtual safety manager may schedule a coaching session in favor of the driver who is more likely to be away from the home terminal in subsequent days.

In addition to "long-haul", "truckload", and "less than truck load", another driver profile that may serve as a factor for scheduling may be referred to as a "city" driver. A city driver may tend to deliver packages locally. Furthermore, they may be expected to transport themselves to a terminal at a start of a shift, where their truck may be expected to be properly loaded for them, so that they can leave quickly. A city driver may then make a series of deliveries and pickups throughout the day, and then may return to the terminal briefly at night, before heading away in a personal vehicle. For city drivers, a virtual safety manager's scheduling capability may enable a human coach to schedule a number of coaching sessions in a single evening based on updating estimates of when the driver is expected to return to the terminal. For example, the virtual safety manager may have as a policy that it will only schedule a face-to-face coaching session with a driver if the human coach will be available for the coaching within 5 minutes of the driver's return to the terminal. In this way, a human coach may reach more drivers and may deliver coaching to drivers who may be in a better mood compared to drivers that were made to wait for long periods at the end of a shift.

According to certain aspects, where a fleet employs multiple safety managers, coaching assignments may be assigned to different individual safety managers. Factors on which safety manager assignments depend may include workload, experience level, and relationship between the safety manager and the driver to be coached.

According to certain aspects, a virtual safety manager may schedule coaching sessions based in part on safety manager "bandwidth". A typical medium-sized fleet might assign between 10-50 drivers to a front-line dispatch manager. In some fleets, front-line dispatch may handle safety-management duties as well. Alternatively, a dedicated safety manager may oversee over 100 drivers. A system configured according to some of the teachings disclosed herein could increase the number of drivers that a safety manager could effectively manage by substantially removing the scheduling function and reducing dead periods between coaching sessions, while at the same time enabling more focused and effective coaching sessions.

Furthermore, such a system may enable a broader reach. Some fleet organizations may effectively ignore drivers who are performing well and avoiding accidents. By using some of the automated systems and methods disclosed herein, a safety manager may periodically reach these high-performing drivers to acknowledge them with positive feedback based on specific instances and metrics that attest to their exceptional driving.

Matching Level of Coaching Engagement to Situation

Embodiments of certain aspects of the present disclosure may include automated methods of matching a level of coaching engagement to a situation. There may be multiple manners of delivering feedback and coaching instruction. The different manners of coaching may demand more or less time and energy of a coach. Accordingly, certain aspects of the present disclosure are directed to automatically matching a suggested manner of delivering feedback to the content of the message and/or the severity of the behaviors to which the coaching is directed. A ride-along may be considered the most time-intensive form of coaching. An automated smartphone notification may be considered the least time-intensive form of coaching. Certain aspects of the present disclosure are directed to methods of delivering feedback, such as a snapshot of a driver's compliance statistics, as described above, that make use of analytics routines performed by an edge perception engine.

In addition to selecting which driving behaviors to coach, and which drivers to coach, as described above, a virtual safety manager may determine how to coach. In this section, systems and methods are disclosed for determining, for example, whether a coaching message should be delivered as a text message or an email notification, or delivered in person, etc.

A determination of how to coach may be based on a severity of the coaching message. For example, if a driver had an accident, a virtual safety manager may respond in a way tailored to that urgent situation, as described above. If a driver were selected for coaching based on a low Green-Zone score, in contrast, the coaching session may be handled differently.

Certain aspects of the present disclosure are directed to selecting a level of coaching based on the coaching content. In responding to a crash, a level of coaching in response to an accident may depend on preventability and may be further based on an accident history for the driver. Likewise, in response to detection of a severe High-G event, followed by a determination that the truck has become stationary, a virtual safety may first send a text message to the driver to determine if the driver is able to acknowledge the message. Once contact with the driver is made, the virtual safety manager may proceed with a response template associated with responding to a verified minor accident.

For an IDMS, a moderate High-G event may correspond to an occurrence of a minor accident. Because a detection trigger threshold for such events may be lower, however, the incidence of false alarms may be higher. Accordingly, a virtual safety manager may first attempt to verify that the detected event was attributable to a minor accident. As described above, a GPS trace indicating that the driver came to a complete stop would support the conclusion that a minor accident occurred. In addition, or alternatively, a driver may push a button on an IDMS device or may call the home office to report the accident. When the event is verified, the virtual safety manager may check for available video. For example, it may retrieve additional video data for context surrounding the accident.

In some embodiments, a virtual safety manager may start a process to file a report regarding the accident. In the case that the accident may meet non-preventable criteria, the virtual safety manager may begin to compile data for a DataQ RTR. Concurrently, the virtual safety manager may retrieve accident data for the driver who was involved in the accident. Depending on an accident history, a level of coaching for an upcoming coaching session may be determined. If this current accident were the first within a two-year period, a face-to-face discussion may be scheduled. If this were the second preventable accident within a two-year period, a ride-along may be scheduled. For three or more accidents within a two-year period, the driver may be assigned basic training. In addition, disciplinary measures may be taken, such as suspension and ultimately termination. In some cases, the driving behavior exhibited prior to the accident may be so extreme, that an appropriate response may include job termination. This last option may be appropriate for a new hire who has made an egregious error, for a driver who was asleep at the wheel, and the like, where the risk of keeping the driver employed as a driver may be too significant.

Where, after an accident, it is determined that the driver should receive a focused coaching session, the virtual safety manager may assist a human coach by pre-populating a coaching session file with relevant data, as described above. In some embodiments, the virtual safety manager may prepare a coaching session to review the accident as well as associated driving behaviors. As described above, the occurrence of an accident may be an opportunity to introduce an experienced driver to the available coaching tools, the driver's profile, scoring trends, and the like. For example, the coaching session may include data regarding the driver's stop sign behavior, if that stop sign is below average, but not otherwise at a level that would cause a virtual safety manager to select the driver for coaching.

The virtual safety manager may assemble contextual video data to illustrate how the accident could have been prevented. In some cases, a coach may indicate that certain steps could have been taken one or two minutes earlier, which may have substantially avoided the risky scenario that the driver eventually encountered. The virtual safety manager may also assemble compliance and behavioral metrics indicative of the driver's risk in similar situations. For example, if the accident occurred at an intersection, the coaching session may include a representation of the driver's gaze patterns as they approach intersections in general. The coach may be able to review video with the driver and ask questions such as whether he or she could have anticipated a light turning yellow or red. By assembling relevant video and compliance and behavioral statistics, a coach may be able to communicate a picture regarding the extent to which a driver is driving defensively. The behavioral statistics, such as gaze patterns, may reflect whether the driver is thinking through all of the possible sources of risk at intersections. Similarly, gaze patterns could be used to understand if the driver is properly scanning a parking lot upon entry, in the case that the accident occurred in a parking lot. In some cases, the virtual safety manager, by assembling and organizing video and other data relating to the driver's driving habits may remind the driver what he or she should be doing as a professional driver. This may be accomplished even in the absence of a face-to-face or telephonic coaching session with a human coach or manager.

As described above, a virtual safety manager may select drivers for coaching based on predictive or statistical criteria. For coaching sessions identified in this way, a face-to-face or phone call may be an appropriate method of delivery. Furthermore, automatic coaching without manager participation may be sufficient. For this level of coaching, a virtual safety manager may prepare a small number of alert videos. For telephone or self-coaching levels, impactful video data may be sent to the driver through a smartphone app, as described above.

In some embodiments, a virtual safety manager may prepare a coach for a coaching session by delivering coaching tips and reminders to the coach. Examples of such messages may include: Keep it positive, Reinforce positive behaviors, Focus on what needs to change to improve safety—don't nitpick, Conduct in a private area, Complete coaching, Review stats/history with driver, Show video(s), Get driver feedback/ask what he/she could have done differently, Explain how and why to correct behavior (safe driving principles, company policy, etc.), Ask for driver agreement/commitment to improve, Document the coaching, Enter a brief summary of coaching session, End on a positive—reinforce importance of being safe, always. Respect the driver's privacy—do not discuss coaching with unauthorized personnel.

A coach may then deliver face-to-face or telephonic coaching by explaining the content of the pre-populated coaching content. The coach may explain, for example, that over a certain period, the driver had 25 traffic light violations. The virtual safety manager may include text of certain highlights to remind the coach what should be brought to the driver's attention during the coaching session.

A remote by-phone coaching session may be an appropriate level of coaching in response to an observed decreasing trend in a driver's GreenZone score or GreenZone component score. Another example for which a remote by-phone conversation may be appropriately matched to the behavior being addressed may be a driver's failure to show improvement on one or more company policies. This may include a high number of U-Turn alerts, Red-Light, Stop Sign, Speeding, and the like.

In some embodiments, a virtual safety manager may monitor a coaching session to ensure that the coaching session is proceeding as desired. For example, a coaching session may be scheduled to last between 5-10 minutes, based on the material to be presented and limited by the observation that a driver's receptivity to coaching feedback of a certain kind may start to decrease if the coaching session carries on for too long. In this example, a virtual safety manager may provide reminders during the coaching session that are intended to keep the coaching session moving along. In some cases, the virtual safety manager may remove some of the coaching material if the coaching session is running long. In this way, a virtual safety manager may help a human coach or safety manager maintain the interest of a driver and remain focused on the goals on the coaching session.

A virtual safety manager may determine that coaching should be delivered directly from the virtual safety manager. In conjunction with a smartphone app, a driver may be able to see for themselves how their driving could be improved. Where appropriate, direct coaching from a virtual safety manager may free up manager or coaching resources. A direct coaching session from a virtual safety manager may be referred to as a "Remote—no phone call" coaching level.

Examples of coaching sessions that may be appropriately assigned to a "Remote—no phone call" level may include a high number of alerts of a type indicative of a failure to comply with one or more company policies, such as a high number of U-Turn alerts, Red-Light, Stop Sign, Speeding etc. For some fleets a decision to coach on these behaviors with or without a phone call may depend on a degree of compliance.

A "Remote—no phone call" coaching decision may be based on prior driver engagement with a Driver App, which may be a smartphone app that is part of a virtual safety manager. In may be observed that drivers having lower driver scores also tend to be drivers who fail to engage with the app. Likewise, drivers with higher scores, who may therefore be less in need of coaching, may engage with the app every day. Furthermore, it may be observed that app usage itself correlates with an improvement in driver scores. In light of these observations, a virtual safety manager may maintain a log of driver engagement with a Driver App.

In some embodiments, real-time feedback may be delivered on an IDMS device. This feedback may be considered a brief coaching message whose effectiveness stems from its immediacy. A virtual safety manager may determine that some alert types for which Real Time feedback is appropriate, and some for which Real Time feedback is usually not appropriate.

A virtual safety manager may be configured to adapt the frequency of real-time notifications to a particular driver. Based on an observation that real-time alerts that are too frequent may be habitually ignored, a virtual safety manager may adjust real-time notification thresholds to the style of the driver so that driving behaviors may be continually shaped across multiple performance regimes. In some embodiments, real-time notification thresholds may be adapted across a group of drivers. In this way, better drivers may bring underperforming drivers along in an indirect manner, by virtue of causing the real-time notification thresholds to become tighter over time.

In some embodiments, a virtual safety manager may deliver summary trip statistics via a computerized voice at the end of a drive. The voice may say, for example, that the driver's score increased or decreased over the course of the trip. It may also identify how the driver performed on a particular driver behavior of interest, such as a driving behavior that was identified in a recent coaching session.

In some embodiments, a selection of coaching level may be based in part on where a driver is along a general training trajectory. Drivers who are in an earlier stage of general training may be more likely selected for a face-to-face coaching session, whereas more experienced drivers may be coached with automated, remote methods, at least initially.

Social Coaching Methods

Embodiments of certain aspects of the present disclosure may include automated methods that facilitate indirect, social coaching. Driver recognition may be an organizing principle of a virtual safety manager. First, a driver score enables recognition for above-average driving. A driver with a driver score that is substantially above average for the fleet may be recognized in a manner that his or her colleagues may take notice. A virtual safety manager may therefore provide a list of names of high-performing drivers, which may be communicated broadly within the company via newsletters, promotional videos, or other aspects of their safety recognition program. By recognizing exceptional driving, a virtual safety manager may indirectly reinforce a message that a coaching system is not only concerned with catching negative aspects of driving behaviors. The coaching system is also concerned with the good things too.

In some embodiments, a driver may access his or her score via a Driver App and may additionally access a ranking. For example, the driver may see that he or she is among the top ten percent of drivers in the fleet. In some embodiments, Driver App notifications may be delivered when a driver moves up in the rankings. In this way, under-performing drivers and high-performing drivers may become more motivated to continuously improve their driving habits and skill.

In some embodiments, a virtual safety manager may provide an interface by which a fleet may recognize drivers who consistently achieve high driver scores over a week or month's period of time. Overall and specific scoring may be employed. For example, a virtual safety manager may list the top ten performers in each of a number of different categories, drivers with the most improved scores, and the like. In some embodiments, the interface may populate a leaderboard on a group Facebook page.

In some situations, informing drivers of how they stack against each other may make individual drivers more receptive to coaching on particular behaviors. For example, by referencing a driver's behavior to scores for the same behavior across the fleet, a driver may come to understand that his or her behavior is not just below a company target, but it is also below his or her peers. On the other end of the spectrum, driver recognition in this fashion may be a means of encouraging top performing drivers to remain with the present company.

FIG. 15 illustrates an example of a Monthly report that may be automatically generated by a Virtual Safety Manager. The report includes a distribution of driver scores (i.e. GreenZone scores) across the fleet. It also includes summary statistics and trends, such as a fleet average score across two months. In addition, it identifies the top and bottom 5 drivers from the fleet. It also includes statistics on certain alert types and categories of interest, such as Traffic Compliance and Hard Driving.

FIG. 16 illustrates a Following Distance Insights report. This report may be considered similar to the Monthly report illustrated in FIG. 15, although the Following Distance Insights may be focused on Following Distance behavior. This report also includes links to alert videos that had high severity scores for two types of alerts—following distance and hard braking.

According to certain aspects, a virtual safety manager may create or facilitate the creation of educational videos. Educational videos may be based on captured examples of exceptional driving. These videos may highlight relatable examples of what a driver should do in a dangerous and/or rare situation. In some cases, the educational videos may include examples of what not to do. Such videos may be anonymized. Alternatively, such videos may be another technique of harnessing indirect, social delivery of coaching messages.

Another form of education video may be directed to bonus incentive programs. In one example, a virtual safety manager may identify example videos that clearly illustrate something that a driver can do to earn a safe driving bonus.

Another form of education video might include an illustration where a compliant behavior avoided an accident. Videos of this type may also be used as "comparison" videos in individual coaching sessions, as described above.

According to certain aspects, a virtual safety manager may create or facilitate the creation of a "highlight reel." A highlight reel may include videos that have an additional entertainment value, and that a fleet may play in a loop, for example, in a driver lounge. In some embodiments, a virtual safety manager may periodically create a playlist based on video data captured from the fleet. The virtual safety manager may provide a URL, so that a fleet may point a web browser to the URL and automatically establish a type of "fleet TV station."

A highlight reel video selection might give greater weight to abnormal situations whereas educational videos might have a more everyday focus. A highlight reel for example, may have illustrated situations where a driver was involved in an accident that was non-preventable. These situations may have limited educational value but may serve to reinforce the exoneration value of the fleet's IDMS deployment. In some embodiments, a virtual safety manager may apply privacy screens to portions of the video data so as to anonymize the drivers and vehicles that were involved in the accident.

Summaries of Coaching Effectiveness

A virtual safety manager may include a variety of attributes by which the virtual safety manager may keep track of, report on, and improve its own performance. In some embodiments, a virtual safety manger may provide and track documentation of individual coaching sessions, system wide coaching activity metrics, as well as effectiveness metrics relating to impact on specific driving behaviors, driver scores, accident rates, and/or citation rates for the fleet. For fleets with multiple safety managers or offices, summary statistics may be broken down by safety manager, team, or office.

Documentation of individual coaching sessions may be organized through a coaching session page in an IDMS portal. In some embodiments, comments by drivers made in the context of self-coaching sessions may be stored and made available for inspection on a coaching page. Likewise, fleet safety managers and coaches can document the coaching of their assigned drivers in the same location. In some cases, the virtual safety manager textual summaries may be stored. The documentation of coaching processes may help protect a fleet from potential liability in the case of serious accidents involving their drivers. A coaching portal may illustrate a fleet's commitment to safety and continuous improvement, as well as specific documentation of a coaching history of an involved driver.

Coaching records may keep substantially the same information that was populated while preparing a coaching session, as described above. A coaching session documentation may be as minimal in some cases as a record that the driver acknowledged a coaching session notification. For example, as described above, a self-coaching session may be sent to the driver at a scheduled time. The system may then document whether the driver acknowledged the notification. In an embodiment with more detailed coaching records, the individual coaching session documentation may include indication of whether the driver reviewed any of the alert videos attached to the coaching session, which ones, and for what duration.

In some embodiments, documentation of an individual coaching session may include driver responses to specific questions that indicate attentive engagement with the coaching material. Examples of such questions may include— were you using your phone in this video? Were you wearing your seatbelt in this video? Which of the following highlighted behaviors will you pick as an area of focus for the next month?

In some embodiments, a driver's coaching session commitments may form a basis of a bonus plan. For example, if a driver commits to improving a certain compliance behavior in the coming month, and subsequently reaches a target that was agreed upon by the safety manager, the coach, or in some cases the virtual safety manager, then the driver may earn a performance-based bonus in that pay period.

Another level of virtual safety manager summary may be directed to system-wide coaching activity metrics. Within a fleet, or broken down between regional offices, the virtual safety manager may keep track of who was coached, who watched video, who rejected feedback, which drivers consistently reject or ignore coaching sessions and the like. In this way, a fleet manager may be enabled to identify problematic safety issues and proactively address them. Likewise, the virtual safety manager may be able to make determinations about which drivers are being effectively coached using automated methods, and which ones should be escalated to a human coach.

A virtual safety manger system may include systems and processes to establish and track coaching effectiveness metrics. As one example, a virtual safety manager may maintain a database of DOT-recordable accidents, costs per accident, time spent trying to reach a settlement for accidents in which the fleet acknowledged fault, a number of traffic citations, FMCSA scores, and the like. Furthermore, the virtual safety manager may maintain a database of driver retention metrics, such as driver turnover and average costs to replace a driver. Additional metrics may include a number or percentage of drivers who have actively used the app, correlations between app usage and performance, and other metrics that may track engagement. Metrics such as the ones just described may be automatically assembled into quarterly, monthly, or otherwise periodic statements. Accordingly, a virtual safety manager may quantify the impact of its own use.

A virtual safety manager may include systems and processes to track the coaching effectiveness of individual human safety managers. Such metrics may include behavioral measures of the safety managers, such as: how quickly is a safety manager responding to an accident? What is the coaching queue for each safety manager? Other metrics may include coaching effectiveness metrics described above that are organized on a per safety manager basis. In some embodiments, in further view of a maintained accident cost database, a safety manager's effectiveness may be computed in terms of estimated savings from reduced accidents and traffic citations avoided.

Figure 17:
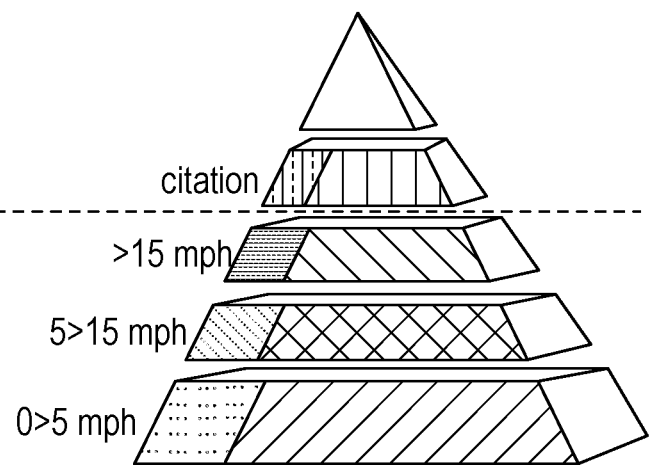
FIG. 17 illustrates an example of a safety pyramid adapted to traffic citations in accordance with certain aspects of the present disclosure.

FIG. 17 illustrates a safety pyramid that is adapted to driving citation events. For example, a driver may receive a citation for speeding. A predictive metric for receiving a citation may be an amount of time spent driving above the speed limit. Furthermore, the driver may be more likely to receive a speeding violation if the driver is speeding more than 15 miles per hour above the speed limit. By reducing an amount of time spent speeding, a driver may also reduce risk of receiving a citation for speeding.

Furthermore, as with the social coaching methods described above, the safety or fleet managers within a fleet may be able to see where they rank among their peers. Likewise, social coaching methods may include acknowledgements of the best performing offices, and the like. The best performing offices may be ranked according to accident rate, loss rate, etc., and/or in terms of targeted driving behaviors (e.g. following distance and traffic lights), which may be relatively more frequent and therefore more easily tracked and compared across short time scales relative to the time scales at which a meaningful reduction in a collision rate may be observed.

Further, in addition to tracking coaching effectiveness, a virtual safety manager may provide metrics reflective of potentially biased coaching judgements. For example, the virtual safety manager may provide a summary view of how many drivers are being over selected or under selected for coaching by a human manager, where that determination is based in part on which drivers a virtual safety manager would have coached in the same period.

Systems and Methods of Preventing Unsafe Situations

Embodiments of certain aspects of the present disclosure may include automated methods of engineered avoidance. According to the Occupational Safety and Health Administration (OSHA), approaches to safety may be considered to fall into one of three "lines of defense." In order of increasing effectiveness, a first line of defense may include personally protective equipment, and second line of defense may include training, and a third line of defense may include an engineered avoidance of a perceived risk. Taking as an example a factory floor workplace in which a dangerous machine operates, a first line of defense may include outfitting a worker with safety goggles or heavy gloves; a second line of defense may include a training program in which people who operate the machine are instructed on proper use, and other people who do not operate the machine are instructed to maintain a distance from the machine; a third line of defense involves placing the machine within an enclosure, so that people who do not operate the machine cannot get close enough to it where they would be at risk, and further, people that do operate the machine may only access it in limited ways that physically shield them from sources of injury that are known to result from improper operation of the machine.

Applied to the context of commercial driving, a first line of defense may include outfitting a vehicle with collision warning, automatic braking, and the like. A second line of defense may include training a driver on how to handle unsafe situations that may arise while driving. A third line of defense may include systems and methods directed to avoiding unsafe situations so that the accident risk is avoided before it occurs.

Certain aspects of the present disclosure are directed at leveraging data collection and analysis to prevent unsafe situations. These may be considered systems and methods of engineered avoidance. Examples of data transformations that may be leveraged for engineered avoidance, and which may therefore be considered a third line of defense strategy, may include identifying the most dangerous intersections along a driver's proposed route and adapting the route so as to avoid such intersections. Systems and methods disclosed herein, as described in previous sections may also be directed to second and first line of defense strategies. For example, training drivers how to go through intersections in a commercial vehicle may be considered a second line of defense strategy. Audible or visible real-time notifications may be considered a first line of defense strategy.

In some embodiments, a virtual safety manager may automatically impact route planning software. Some fleet dispatch systems may include route planning software that find efficient routes based on time, distance, and fuel economy, so that a driver may schedule and plan a series of pickups and deliveries. A virtual safety manager may identify the locations along such routes where accidents have occurred with a greater than average frequency. In some embodiments, a virtual safety manager may provide an alert based on such a determination. Alternatively, or in addition, a virtual safety manager may provide an application interface that may be queried by route planning software so that the geographical and other safety risks may be included in the route planning software route planning. In some embodiments, a virtual safety manager may maintain a map of locations and road segments that should be avoided and may make such maps available so that they may be integrated within route planning systems.

In one example, a virtual safety manager may put a virtual "cage" around an intersection having a sharp turn which has a substantially higher accident risk than a convenient alternative. In this way, a virtual safety manager may move up the "lines of defense" safety hierarchy. In some embodiments, this virtual cage may cause route planning software to avoid the intersection.

In some embodiments, a virtual safety manager may issue real-time audible notifications to the driver that may be entering a location having known hazards. Likewise, real-time audible notifications may serve to warn and/or remind a driver that a proactive driving maneuver may be safer than a typical maneuver. For example, the virtual safety manager may provide an indication corresponding to a preferred time of merging into an exit lane. Based on the observation that accidents occur at a higher rate when a driver makes a late exit from a highway, a proactive reminder that the driver could safely merge at an earlier time may have the effect of preventing a risky situation from occurring.

In some embodiments, a virtual safety manager may provide an indication to the driver that relates to a geographical risk of the current road. For example, the driver's vehicle may be loaded to a heavier weight than the road on which it is driving is rated to support.

Job Dispatch Decisions Based in Part on Safety Scores

Embodiments of certain aspects of the present disclosure may include automated methods of determining job dispatch decisions based in part on safety scores. Examples include driver assignments based on a safety profile of a vehicle and/or route, which may include systems and methods of determining a risk profile of a transportation job. Another example includes safety status-based assignments as part of a driver retention plan.

In some embodiments of certain aspects of the present disclosure, a driver assignment may be based at least in part on a safety profile of a vehicle and/or route. For example, a vehicle sharing service may involve a pool of vehicles which may be leased on a temporary basis to an individual member or subscriber of the vehicle sharing service. Aspects of the present disclosure may be directed to the avoidance of certain risky pairings of a driver to a vehicle or route. In one example, a virtual safety manager may determine that a driver has a propensity to slam on brakes. Such a driver may only be eligible to rent certain vehicles, such as vehicles having certain safety features (collision warning), or maintenance records (brakes passed an inspection within last 3 months). Likewise, if a vehicle appears to have acceptable brakes, but has missed a first inspection deadline, the vehicle may only be assigned to drivers who are below a hard-braking propensity threshold. In this way, vehicles may still be allocated in an efficient manner, by subjecting vehicles that are leased/rented/assigned to riskier drivers to more stringent testing and driver assistance criteria.

In some embodiments, a virtual safety manager may compile statistics that may include a safety profile of drivers. Likewise, a virtual safety manager may determine risk scores for routes. For example, routes which pass through many intersections may be riskier than routes with pass through fewer intersections, all else being equal.

Based on risk profiles of drivers and on routes, a virtual safety manager may preferentially assign riskier routes to drivers who have historically shown less risk in such situations. Likewise, a virtual safety manager may make such routes available to high-performing drivers, who may choose to accept them since they may be associated with higher pay, shorter hours, and the like, or who may choose to reject them in view of a less stressful route.

In some embodiments, risk profiles of drivers may be granular, such that a driver's safety score may be determined separately for different driving conditions. Accordingly, a virtual safety manager may identify some drivers that are better at intersection management. These drivers may be preferentially assigned to urban routes. Similarly, other drivers may be identified as having safety profiles reflective of attentive speed management and following distance maintenance. Drivers in this latter group may be preferentially assigned to long haul routes. A virtual safety manager may likewise determine job dispatch decisions based on non-compliance events. For example, a driver who does a lot of red-light jumps may be assigned to jobs having fewer intersections, at least until such behavior improves.

In addition to the efficiency and risk-reducing benefits, the job dispatch functions performed in certain embodiments of a virtual safety manager may reduce a common source of bias. Automated methods may ensure that job assignments are supported by objective data.

As mentioned above, a virtual safety manager may determine a safety profile of a route as part of a match-making job dispatch service. In some embodiments, each job to be performed may have a safety score, a safety code, and the like. An example of a safety code of a job may correspond to "long-haul". In some embodiments, a safety score of a job may be based in part by how much of the trip would be characterized as "long-haul". Therefore, a job that is 60% long-haul, 30% city, and 10% other may be assigned a safety code of "long haul", and/or may be assigned a safety score that incorporates the entire makeup of the trip. In this example, a second job that is 70% long-haul, 20% city, and 10% other may be characterized as having the same "long-haul" code but may have a higher "long-haul" score than the first example.

In some embodiments, a virtual safety manager may determine modes of kinds of trips that drivers in a fleet typically make. This may involve a method to automatically characterize risk of trips based on the presence of certain risks. In some embodiments, roads may be characterized as roads where tailgating is possible (e.g. highways) vs. roads where stop-sign or traffic light violations are possible (e.g. surface streets). Having assigned availability of risk associated with different segments of a trip, a trip profile may then be based on the mix of road types and therefore the exposed to different types of driving behaviors. The magnitude of these may then be used as weights against a driver profile for the behaviors that are possible in those different situations. In this way, an expected risk for each trip based on safe driving propensities of each driver may be assessed.

A risk match-making function may serve a number of useful ends. In one embodiment, a driver's safety status, which may correspond to a driver's safety score within the pool of drivers in the fleet, may provide a driver with preferred assignments. Such a job dispatch mechanism may thus indirectly improve driver retention for high-performing drivers since drivers may experience a benefit that has accrued to them within the fleet as a result of their safe driving.

In some embodiments, a virtual safety manager may assign different drivers to riskier routes in a sequential fashion, so that a number of experienced drivers may "take turns" on the riskier routes. In this way, a virtual safety manager may manage competing aims of ensuring that the riskiest routes are being handled by the most experienced drivers, while at the same time recognizing the same experienced drivers with less stressful jobs on other days.

Another job dispatch decision related to a safety score may relate to assignments of new drivers. As described above, drivers who are in a period of training may be assigned jobs in such a way that they are unlikely to be out of range for a face-to-face safety meeting within one day. According to certain aspects, a driver who is experienced but new to the fleet may earn his or her way out of such a training period based on a quickly established exceptional driver score.

Bandwidth Utilization Based in Part on Video Coachability

Embodiments of certain aspects of the present disclosure may include automated methods of improving bandwidth utilization. In accordance with certain aspects, data bandwidth utilization of an IDMS may be based in part on video coachability.

In one example, an edge IDMS device may be configured to be less likely to transmit data if a virtual safety manager coaching session already contains an example of a similar situation. The already uploaded video may be slightly older but may otherwise have a higher coachability score, as may be determined according to techniques described above.

Similarly, a video recorded at an edge IDMS device may be assigned a higher likelihood of transmission if the video would serve as an effective comparison for a previously uploaded video. For example, the newly recorded video may be a match to the previously uploaded video in that they are both representative of the same type of event, but whereas a negative outcome occurred in the previously uploaded video, such an outcome may not have occurred in the newly recorded video. Alternatively, or in addition, the newly recorded video may include evidence that the driver was more responsive in the newly recorded example. Taken alone, the newly recorded video may not have a high coachability score, but in comparison to a similar video from the same driver, the newly recorded video may serve as an effective illustration of how compliant and/or responsive driving actions can mitigate risk.

In some embodiments, a coachability score may be determined on an edge IDMS device. In these examples, a virtual safety manager may provide or enable a real-time or nearly real-time and automated unsafe incident ranking. With every minute of video being scored, the device may then maintain a ranking of past data stored on the device. By selectively deleting videos with low coachability scores and preserving videos that have higher scores, an edge IDMS may further improve bandwidth utilization efficiencies. For example, based on a premise that most driver coaching will be scheduled for times after the completion of a trip (that is, most coaching may not require an immediate intervention), a virtual safety manager may choose to transmit the most coachable video data at or near the end of a trip. This may save bandwidth associated with transmission of certain videos which were transmitted due to a high coachability score that were then replaced by other videos from the same trip with even higher coachability scores.

Figure 18:
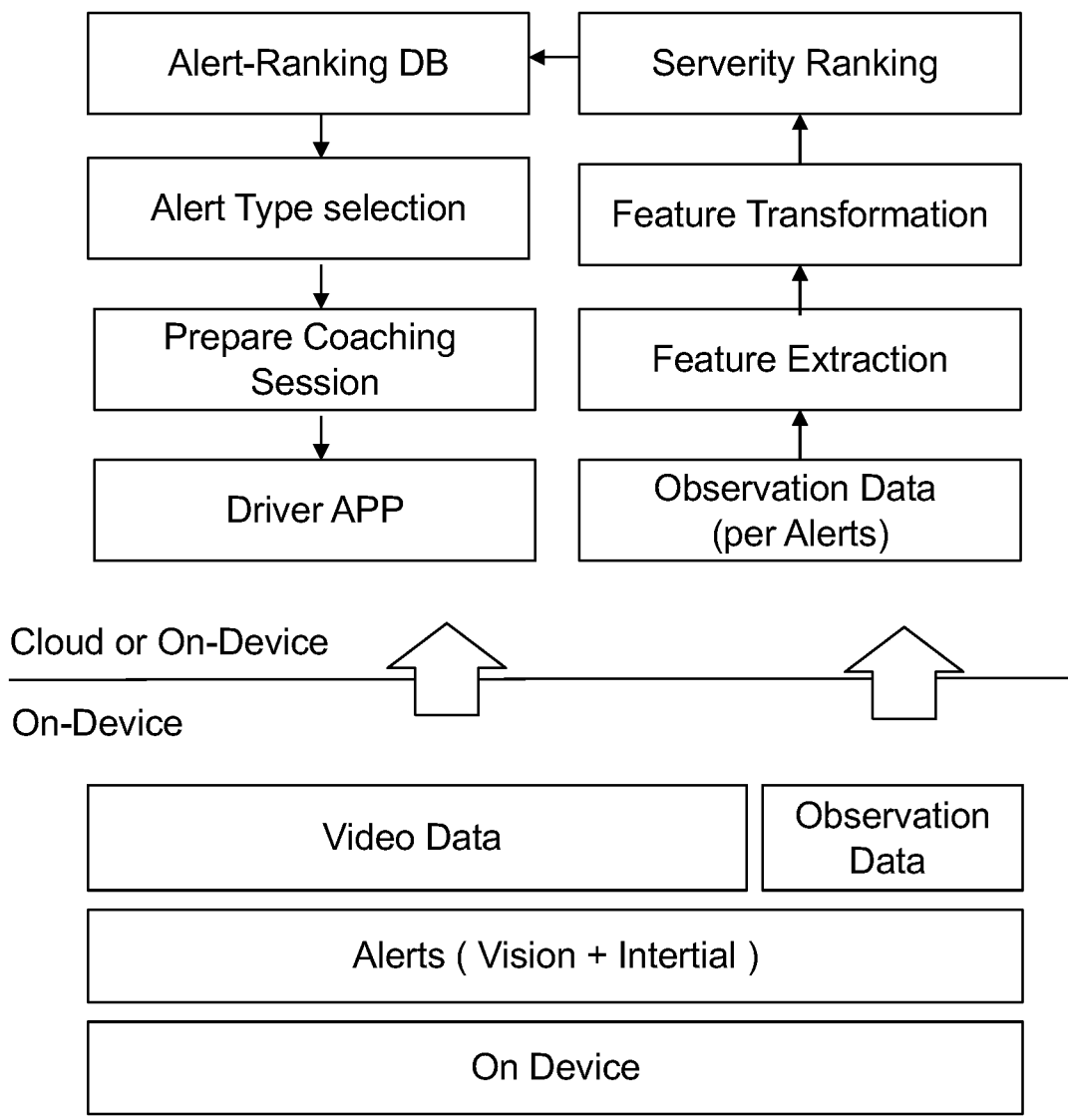
FIG. 18 illustrates an example of data bandwidth conservation in accordance with certain aspects of the present disclosure.

FIG. 18 illustrates how a Virtual Safety Manager may conserve data bandwidth. In this illustration, based on Observation Data extracted from Vision and Inertial and other data streams on an edge device, a Virtual Safety Manager may perform a number of processing steps that may result in a selection of Alerts for a Coaching Session. Because there is no human in the loop, the Video Data itself may remain on the device until the Coaching Session video data is selected. At that point, or at a point that is convenient prior to or during a coaching session, the selected video data may be retrieved from the edge device. In this way, data bandwidth associated with video data uploaded may be conserved.

In some embodiments, a virtual safety manager may be configured so that video data that may serve as a basis for an immediate intervention (e.g. drowsiness, texting while driving, and the like) may utilize cellular data bandwidth, while other video data may be stored locally and then selectively transmitted when a less expensive or free wireless transmission option, such as wi-fi, is available. Similarly, a virtual safety manager may transmit video thumbnails of non-emergency video data during a trip and over cellular networks and may transmit full videos otherwise. In this latter example, a human operator may get a gist of the non-emergency alerts and may have an option to request the full videos over a cellular connection.

In some embodiments, video may be queued on device based on coachability and may be offloaded in accordance with a coaching schedule. For example, if a driver is scheduled to participate in a coaching session once per week, the video data offload may be scheduled to occur on the last day of a review period. Likewise, a video data queue may be maintained on an edge device and then pulled whenever a coaching opportunity presents itself. For example, if a driver engages a smartphone app while the edge IDMS device is powered on, the driver may be able to access coachable video data directly from a device via a bluetooth, WiFi, or other short-range communication protocol. In this example, the driver may cause the device to transmit video data directly to his or her smartphone device in an interactive fashion. For example, a driver may review one or more alerts of a kind that are most heavily influencing his or her driver score. Alternatively, the driver may be interested in reviewing any video data on the device which is a candidate for a fleet-wide highlight reel.

In some embodiments, a driver may interact directly with an IDMS device in the sense that the video data need not be transmitted to a cloud server. In this configuration, the smartphone app may record a trace of driver interactions with device data as part of a self-coaching record keeping. This user interaction data may be communicated to a remote server and may be used a factor in determining which aspects of driving behavior should become the subject of subsequent coaching sessions, in light of which areas are being actively and effectively self-coached.

As used herein, the term "determining" encompasses a wide variety of actions. For example, "determining" may include calculating, computing, processing, deriving, investigating, looking up (e.g., looking up in a table, a database, or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more specialized processors for implementing the neural networks, for example, as well as for other processing systems described herein.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a thumb drive, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method comprising:
receiving visual data from a camera of at least two cameras of an AI dashcam device affixed at a windshield of a vehicle driven by a driver and comprises a memory, at least one processor, and the at least two cameras, wherein the at least two cameras comprise a driver-facing camera and a forward-facing camera;
detecting, by the at least one processor of the AI dashcam device, a plurality of non-collision driving events for the driver based on the visual data from the camera of the AI dashcam device, wherein each driving event of the plurality of non-collision driving events for the driver belongs to a first type of driving event;

selecting a first driving event from the plurality of non-collision driving events for the driver that is representative of the plurality of non-collision driving events for the driver as a coachable example of the first type of driving event; and generating an alert presenting, to a computing device of the driver of the vehicle, a first video based on the visual data corresponding to the selected first driving event.

2. The method of claim 1, further comprising:
presenting a second video to the driver; wherein the second video includes a non-collision driving event of the first type.

3. The method of claim 2, wherein the second video is representative of a target safe driving behavior in driving scenarios corresponding to driving events of the first type.

4. The method of claim 2, wherein the second video further includes a collision event or a near-collision event.

5. The method of claim 4, wherein the type of driving event is speeding relative to other vehicles.

6. The method of claim 5, wherein the first driving event comprises the vehicle travelling in a highway exit lane at least fifteen miles per hour faster than traffic in an adjacent lane.

7. The method of claim 6, wherein the second video comprises a record of a second vehicle travelling in a second highway exit lane; and wherein the second video further comprises a record of a third vehicle exiting an adjacent lane and entering the second highway exit lane, in which the second vehicle is travelling.

8. The method of claim 7, wherein the second video further comprises a record of a collision between the second vehicle and the third vehicle.

9. The method of claim 7, wherein the second video further comprises a record of the second vehicle braking and avoiding a collision with the third vehicle.

10. The method of claim 4, wherein the type of driving event is entering a parking lot.

11. The method of claim 10, wherein the first video based on the visual data comprises a record of the driver failing to visually scan the parking lot upon entry.

12. The method of claim 11, wherein the second video comprises a collision with a static object in the parking lot.

13. The method of claim 11, wherein the second video comprises a record of a second driver visually scanning the parking lot upon entry.

14. The method of claim 4, wherein the type of driving event is approaching a traffic light; wherein the first video based on the visual data comprises a record of the driver in a distracted state when approaching a green light; and wherein the second video comprises a second driver in a distracted state when approaching a traffic light as it turns from green to yellow.

15. The method of claim 4, wherein the second video comprises at least one of a record of a hard-braking event in the presence of a second vehicle or a collision with the second vehicle.

16. The method of claim 1, wherein the first driving event is selected based on a degree to which it is typical of the driver's behavior in driving scenarios corresponding to driving events of the first type.

17. The method of claim 1, wherein the selection of the first driving event is further based on a degree to which it is similar to a second video involving a collision or near-collision in driving scenarios corresponding to driving events of the first type.

18. The method of claim 1, wherein the selection of the first driving event is further based on a degree of predicted impact on the driver's subsequent driving behavior.

19. The method of claim 1, wherein the plurality of non-collision driving events for the driver are detected within a preconfigured period of time, and wherein the preconfigured period of time spans from a first regularly scheduled coaching session to a second regularly scheduled coaching session.

20. The method of claim 1, wherein the plurality of non-collision driving events for the driver are detected within a preconfigured period of time, and wherein the preconfigured period of time spans from a preconfigured look-back period to a time of a detected collision or near-collision driving event involving the driver of the vehicle.

21. The method of claim 1, wherein the first video based on the visual data is transmitted from the AI dashcam device to at least one of a remote server or a driver's smartphone app.

22. The method of claim 1, wherein video data corresponding to at least some driving events that were not selected are deleted from the AI dashcam device and are not transmitted to another device.

23. The method of claim 1, wherein the first type of driving behavior is one for which the driver exhibits a higher rate of non-compliant behaviors relative to other drivers in a fleet to which the driver is associated.

24. An AI dashcam device comprising:
at least one memory unit; and
at least one processor coupled to the at least one memory unit, in which the at least one processor is configured to:
receive visual data from a camera at a of at least two cameras of the AI dashcam device affixed at a windshield of a vehicle driven by a driver, wherein the at least two cameras comprise a driver-facing camera and a forward-facing camera;
detect, by the at least one processor of the AI dashcam device, a plurality of non-collision driving events for the driver based on the visual data from the camera of the AI dashcam device, wherein each driving event of the plurality of non-collision driving events for the driver belongs to a first type of driving event;
select a first driving event from the plurality of non-collision driving events for the driver that is representative of the plurality of non-collision driving events for the driver as a coachable example of the first type of driving event; and
generate an alert to present, to a computing device of the driver of the vehicle, a first video based on the visual data corresponding to the selected first driving event.

25. A computer program product, the computer program product comprising:
a non-transitory computer-readable medium having program code recorded thereon, the program code, when executed by at least one processor, causes the at least one processor to:
receiving visual data from a camera at a of at least two cameras of an AI dashcam device affixed at a windshield of a vehicle driven by a driver and comprises the non-transitory computer-readable medium, the at least one processor, and the at least two cameras, wherein the at least two cameras comprise a driver-facing camera and a forward-facing camera;

detecting, by the at least one processor of the AI dashcam device, a plurality of non-collision driving events for the driver based on the visual data from the camera of the AI dashcam device, wherein each driving event of the plurality of non-collision driving events for the driver belongs to a first type of driving event;

selecting a first driving event from the plurality of non-collision driving events for the driver that is representative of the plurality of non-collision driving events for the driver as a coachable example of the first type of driving event; and generating an alert presenting, to a computing device of the driver of the vehicle, a first video based on the visual data corresponding to the selected first driving event.

\* \* \* \* \*

UNITED STATES PATENT AND TRADEMARK OFFICE
CERTIFICATE OF CORRECTION

| | | |
|---|---|---|
| PATENT NO. | : 11,983,938 B2 | Page 1 of 1 |
| APPLICATION NO. | : 17/777830 | |
| DATED | : May 14, 2024 | |
| INVENTOR(S) | : Adam David Kahn et al. | |

It is certified that error appears in the above-identified patent and that said Letters Patent is hereby corrected as shown below:

In the Claims

Column 54, Line 37 in Claim 24, should read:
"receive visual data from a camera of at least two"

Column 54, Line 63 in Claim 25, should read:
"receive visual data from a camera of at least two"

Signed and Sealed this
Eighteenth Day of June, 2024

Katherine Kelly Vidal
*Director of the United States Patent and Trademark Office*